US010913318B2

(12) United States Patent
Algüera et al.

(10) Patent No.: US 10,913,318 B2
(45) Date of Patent: Feb. 9, 2021

(54) HITCHING DEVICE WITH AUTOMATICALLY CONNECTABLE SUPPLY PLUG COMPONENTS

(71) Applicant: Jost-Werke Deutschland GmbH, Neu-Isenburg (DE)

(72) Inventors: José Manuel Algüera, Aschaffenburg (DE); Stephan Gitzen, Groß-Gerau (DE); Achim Strütt, Riedstadt (DE)

(73) Assignee: JOST-WERKE DEUTSCHLAND GMBH, Neu-Isenburg (DE)

( * ) Notice: Subject to any disclaimer, the term of this patent is extended or adjusted under 35 U.S.C. 154(b) by 156 days.

(21) Appl. No.: 16/061,742

(22) PCT Filed: Dec. 14, 2016

(86) PCT No.: PCT/EP2016/080906
§ 371 (c)(1),
(2) Date: Jun. 13, 2018

(87) PCT Pub. No.: WO2017/102798
PCT Pub. Date: Jun. 22, 2017

(65) Prior Publication Data
US 2018/0370306 A1    Dec. 27, 2018

(30) Foreign Application Priority Data

Dec. 18, 2015 (DE) .................... 10 2015 226 093

(51) Int. Cl.
*B60D 1/02* (2006.01)
*B60D 1/64* (2006.01)
(Continued)

(52) U.S. Cl.
CPC ............... *B60D 1/025* (2013.01); *B60D 1/02* (2013.01); *B60D 1/26* (2013.01); *B60D 1/62* (2013.01);
(Continued)

(58) Field of Classification Search
None
See application file for complete search history.

(56) References Cited

U.S. PATENT DOCUMENTS 2,959,427 A    11/1960    Keese
4,156,551 A *  5/1979    Nagase .................... B60D 1/62
                                                            439/195
(Continued)

FOREIGN PATENT DOCUMENTS

CN    105150783    12/2015
DE    4412111      10/1995
(Continued)

OTHER PUBLICATIONS

International Search Report filed in PCT/EP2016/080906 dated Mar. 3, 2017.
(Continued)

*Primary Examiner* — Jacob D Knutson
(74) *Attorney, Agent, or Firm* — Rankin, Hill & Clark LLP

(57) ABSTRACT

A hitching apparatus includes a towing vehicle-side hitch component, a towed vehicle-side hitch component, a towing vehicle-side insertion connector component having at least one insertion connector configuration as an interface of a towing vehicle-side supply lead for transferring energy and/or information, a towed vehicle-side insertion connector component having at least one insertion connector configuration as an interface of a towed vehicle-side supply lead for transferring energy and/or information, a towing vehicle-side alignment component separate from the towing vehicle-side hitch component and arranged thereon, which carries the towing vehicle-side insertion connector component, and a towed vehicle-side alignment component separate from the towed vehicle-side hitch component and arranged thereon, which carries the towed vehicle-side insertion connector
(Continued)

component. One alignment component includes an alignment configuration and is movable relative to the hitch component carrying it. One insertion connector component is displaceable relative to the alignment component carrying it.

18 Claims, 11 Drawing Sheets

(51) Int. Cl.
*B60D 1/26* (2006.01)
*B60D 1/62* (2006.01)
*B60D 1/36* (2006.01)
*B60D 1/42* (2006.01)

(52) U.S. Cl.
CPC ............... *B60D 1/64* (2013.01); *B60D 1/36* (2013.01); *B60D 1/42* (2013.01)

(56) References Cited

U.S. PATENT DOCUMENTS 9,662,947 B2 * 5/2017 Huegerich ........... A01B 59/002
2013/0277943 A1 * 10/2013 Wendte ................. B60D 1/363
280/421

FOREIGN PATENT DOCUMENTS

| DE | 29701621 | 3/1997 |
|---|---|---|
| DE | 10155056 | 6/2003 |
| DE | 202005005676 | 8/2005 |
| DE | 102006033899 | 1/2008 |
| EP | 0434472 | 6/1991 |

OTHER PUBLICATIONS

German Search Report filed in DE 10 2015 226 093.3 dated Sep. 20, 2016.

* cited by examiner

HITCHING DEVICE WITH AUTOMATICALLY CONNECTABLE SUPPLY PLUG COMPONENTS

The present invention relates to a hitching apparatus for temporary connection of a towing vehicle to a towed vehicle in order to constitute a vehicle combination, the hitching apparatus comprising:

a towing vehicle-side hitch component;

a towed vehicle-side hitch component, the towing vehicle-side and towed vehicle-side components being releasably hitchable to one another in order to constitute a temporary hitched connection, the hitched connection being embodied to transfer a towing force on which towing of the towed vehicle in the vehicle combination is based;

a towing vehicle-side insertion connector component having at least one insertion connector configuration as an interface of a towing vehicle-side supply lead for transferring energy and/or information;

a towed vehicle-side insertion connector component having at least one insertion connector configuration as an interface of a towed vehicle-side supply lead for transferring energy and/or information, the towing vehicle-side and towed vehicle-side insertion connector components being releasably connectable to one another in order to constitute a temporary energy- and/or information-transferring insertion connection;

a towing vehicle-side alignment component, embodied separately from the towing vehicle-side hitch component and arranged thereon, which carries the towing vehicle-side insertion connector component;

a towed vehicle-side alignment component, embodied separately from the towed vehicle-side hitch component and arranged thereon, which carries the towed vehicle-side insertion connector component, at least one alignment component from among the towing vehicle-side and towed vehicle-side alignment components comprising an alignment configuration and being movable relative to the hitch component carrying it, so that the alignment configuration of the one alignment component is conveyable, for mutual insertion connection-preparing alignment of the insertion connector components, into positive engagement with an alignment configuration of the respective other alignment component.

A hitching apparatus of the species is known from EP 0 434 472 A1.

This document already discloses a solution to the problem of not only hitching a towing vehicle and a towed vehicle mechanically to one another via their hitch components to yield a vehicle combination, but also establishing in the context of the hitching operation, as automatically as possible, an insertion connection with which an energy supply of the vehicle combination, proceeding from one vehicle from among the towing vehicle and towed vehicle, is possible, and/or through which information in the form of signals and/or data can be transferred between the towing vehicle and towed vehicle. The term "energy supply" is to be understood as generally as possible. It encompasses supplying electrical, pneumatic, and hydraulic energy, i.e. forms of energy that are used in particular in commercial vehicles. Although in a vehicle combination, usually the towed vehicle is supplied with energy from the towing vehicle, it is not to be excluded that the towing vehicle can also be supplied with energy proceeding from the hitched-on towed vehicle, for example when an energy reservoir on the towed vehicle is still at least partly filled with an energy inventory while, for whatever reason, an inventory of the relevant energy form on the towing vehicle is exhausted. This can occur, for example, if a vehicle battery on the towing vehicle is defective or completely discharged, whereas an at least partly charged electrical battery is present on the towed vehicle.

The known hitching apparatus encompasses a towing vehicle-side alignment component in the form of a square-shaft mandrel that is extendable and retractable in a longitudinal mandrel direction, driven by a piston-cylinder arrangement connected to the mandrel. The longitudinal mandrel direction extends parallel to the longitudinal towing-vehicle direction, the mandrel tip pointing toward the towed vehicle. The towing vehicle-side insertion connector component is rigidly connected to the mandrel that constitutes a towing vehicle-side alignment component. The towing vehicle-side insertion connector component encompasses a plate, extending orthogonally to the longitudinal mandrel direction, which is joined fixedly and nonreleasably to the mandrel by welding. Insertion connector configurations are fixedly received in the plate.

The towed vehicle-side alignment component of the known hitching apparatus encompasses a sleeve, substantially complementary to the mandrel enveloping surface of the towing vehicle-side alignment component, having an introduction aid, facing toward the towing vehicle, in the form of an introduction jaw. The towed vehicle-side alignment component is rigidly connected to the towed vehicle-side insertion connector component. The latter in turn encompasses a plate which is rigidly welded to the sleeve and whose plate region directly surrounding the sleeve extends orthogonally to the longitudinal sleeve direction. Towed vehicle-side insertion connection configurations are fixedly installed in this towed vehicle-side plate, specifically at points that correspond to the insertion connector configurations on the towing vehicle-side insertion connector component when the mandrel is introduced, by an extending motion, sufficiently deeply into the sleeve.

The towed vehicle-side insertion connector component is rigidly connected to the towed vehicle or to a drawbar of the towed vehicle. The towed vehicle-side alignment component encompassing the sleeve is therefore also rigidly connected to the drawbar of the towed vehicle. The towing vehicle-side insertion connector component is rigidly connected to the towing vehicle-side alignment component, but the latter is connected via a ball joint to the towing vehicle or to its hitch component, specifically in such a way that the notionally prolonged longitudinal center line of a hitch bolt of the towing vehicle-side hitch component contains the ball center point of the aforesaid ball joint.

In the known hitching apparatus, at the end of a successful alignment motion of the towing vehicle-side alignment component relative to the towed vehicle-side alignment component, the insertion connection is always established. This requires a relative long stroke for the mandrel, since the stroke must first sufficiently align the insertion connector components of the towing and towed vehicles relative to one another and, once that sufficient alignment has been established, must ensure that the insertion connection is brought about. The long alignment and connecting stroke of the mandrel which is thus required already necessitates, on the one hand, a certain pre-alignment of the hitch components carrying the alignment components in the context of establishing the mechanical hitched connection so as to constitute the vehicle combination, and on the other hand, because of the long stroke, requires a considerable movement clearance in which the stroke can be performed without collision.

In modern towing vehicles, this movement clearance required for the long stroke of the alignment component of the known hitching apparatus does not always exist. Although they are obtained from vehicle manufacturers that produce basic commercial vehicles in series production, commercial vehicles, which predominantly constitute the vehicles on which the hitching apparatus discussed here are utilized, represent individualized single products by the time they are finally ready for utilization by the customer. Depending on the intended use, the series-produced basic commercial vehicle is individualized for the particular customer, for example, by the fact that the space below a loading surface is used for the reception of functional assemblies, for example pneumatic pressure accumulators, additional tanks, gauges and conveying pumps such as those used, for example, in tank vehicles, operating-agent reservoirs, and much more. As the vehicles become more complex, the movement clearance available for the hitching apparatus and its pertinent components thus becomes increasingly small.

A further hitching apparatus is known from DE 44 12 111 A1. In this hitching apparatus, the towing vehicle-side insertion connector component is connected, with its insertion connector configuration, rigidly to the towing vehicle-side hitch component.

The towed vehicle-side insertion connector component, conversely, is pivotable relative to the towed vehicle-side hitch component, which in this known hitching apparatus also encompasses a drawbar, around two pivot axes that are parallel to one another and orthogonal to the longitudinal drawbar direction. Upon establishment of the hitched connection between the towing vehicle-side and towed vehicle-side hitch components, the towing vehicle-side insertion connector component and the towed vehicle-side insertion connector component are brought into a juxtaposition in which a gated drive system arranged on the towing vehicle-side hitch component comes into operational connection with a cam provided on the towed vehicle-side insertion connector component. The gate of the gated drive system is shaped in such a way that as the motion of the gated drive system progresses, the towed vehicle-side insertion connector configuration is pushed onto, or slid into, the towing vehicle-side insertion connector configuration, and an insertion connection is thereby established between the towing vehicle-side and towed vehicle-side insertion connector components. When the insertion connection is established, that component of the gated drive system which carries the gate secures the insertion connection, thanks to engagement behind the cam of the towed vehicle-side insertion connector component, against a releasing relative motion of the towed vehicle-side insertion connector component away from the towing vehicle-side insertion connector component.

The towing vehicle-side hitch component, which, like the towing vehicle-side hitch component of the hitching apparatus of the species, comprises as a hitch member a hitch bolt movable in its longitudinally extending direction, is coupled to the gated drive system. Upon a displacement of the hitch bolt into a hitched position in which the hitch bolt passes through a towing eye of the towed vehicle, the gated drive system is driven in the manner described above in order to establish an insertion connection. A further drive system on the towing vehicle-side hitch component enables a releasing motion of the component carrying the gate, so that there is no longer any engagement behind the cam of the towed vehicle-side insertion connector component. That component of the gated drive system which carries the gate is coupled bidirectionally to the hitch bolt in such a way that a releasing motion of the component carrying the gate in order to disengage the cam, so as to permit a relative motion of the towed vehicle-side insertion connector component away from the towing vehicle-side insertion connector component, brings about a lifting of the hitch bolt so that with the unlatching of the towed vehicle-side insertion connector component, the mechanical hitched connection between the towing vehicle-side and towed vehicle-side hitch components is also undone. The towing vehicle can then move away from the towed vehicle, the insertion connection being disconnected at the latest along with that motion.

In contrast to the hitching apparatus known from DE 44 12 111 A1, the insertion connection of the hitching apparatus known from EP 0 434 472 A1 can be established and undone independently of any motion of the hitch bolt.

The object of the present invention is to refine a hitching apparatus of the species in such a way that during or after establishment of the hitched connection by the hitch components of the towing vehicle and towed vehicle, automated establishment of an insertion connection in order to implement a transfer of energy and/or information between the towing vehicle and towed vehicle is made possible with a high level of connection reliability in a small physical space, requiring minimal movement clearances for movable components of the hitching apparatus.

This object is achieved according to the present invention by a hitching apparatus of the kind recited initially in which at least one insertion connector component from among the towing vehicle-side and towed vehicle-side insertion connector components is displaceable relative to the alignment component carrying it.

Thanks to this feature according to the present invention, in contrast to the existing art of the species, the insertion connection-preparing alignment of the insertion connector components can occur without already establishing insertion connection of the insertion connector component by way of the alignment operation itself at the end of the alignment operation. The insertion connection-preparing alignment can already be complete before the insertion connector components touch one another, i.e. in particular when the towing vehicle-side and towed vehicle-side insertion connector components are still arranged at a distance from one another. The alignment motion can thus be considerably shorter, in terms of the extent of its motion, than is the case in the existing art of the species.

Thanks to the short alignment motion of the towing vehicle-side and towed vehicle-side alignment components relative to one another, it is moreover possible to establish a correct insertion connection between the towing vehicle-side and towed vehicle-side insertion connector components even when the hitch components carrying the alignment components initially exhibit a comparatively large mutual misalignment upon establishment of the mechanical hitched connection, for example if a longitudinal center axis of the towed vehicle-side hitch component is pivoted out of a longitudinal vehicle center plane of the towing vehicle, orthogonal to the supporting substrate of the towing vehicle, around a line parallel to the towing vehicle yaw axis and passing through a hitch member, for example a hitch bolt, of the towing vehicle-side hitch component, and/or if an equatorial plane thereof, containing the largest periphery of the towed vehicle-side hitch member, in particular a towing eye, is pivoted, around a line parallel to the pitch axis of the towing vehicle, out of an orientation parallel to the supporting substrate of the towing vehicle. A theoretically ideal initial orientation of the towing vehicle-side and towed vehicle-side hitch components upon initiation of a hitching operation for establishment of the hitched connection, which will be referred to below for explanatory purposes, is therefore an orientation in which the longitudinal center axis of the towed vehicle-side hitch component lies in a longitudinal vehicle center plane, orthogonal to the supporting substrate of the towing vehicle, of the towing vehicle, and in which the equatorial plane of the towed vehicle-side hitch member is oriented parallel to the supporting substrate of the towing vehicle.

With the hitching apparatus proposed here, firstly the insertion connector components of the two vehicles can be aligned with one another by relative motion of at least one alignment component relative to the hitch component carrying it, and only once that alignment has been accomplished can the insertion connection be established by further relative motion of at least one insertion connector component relative to the alignment component carrying it.

In the present Application, a component A is in principle regarded as "carrying" a component B if component A is connected to component B in terms of design in such a way that the motion of component B is a sum of the motion of component A and the relative motion of component B relative to component A.

For successful mutual insertion connection-preparing alignment of the insertion connector components it can be sufficient in principle if one of the two alignment components from among the towing vehicle-side and towed vehicle-side alignment components is arranged, relative to the hitch component carrying it, movably thereon, while the respective other alignment component is connected rigidly to the hitch component carrying it. Successful insertion connection-preparing alignment of the two insertion connector components relative to one another can, however, be achieved with relatively short alignment motion paths, even when the relative position of the hitch components deviates more greatly from the theoretically ideal initial orientation upon establishment of the hitched connection, if each of the two alignment components is arranged, relative to the hitch component carrying it, movably thereon.

Considered the other way around, if one proceeds from a predefined desired total movement clearance of the alignment components, the individual movement clearance of an alignment component relative to the hitch component carrying it can be reduced if each alignment component is arranged movably relative to the respective hitch component carrying it. The smaller the relative movement clearance of an alignment component needs to be made relative to the hitch component carrying it, the more stable and robust the overall structure made up of the alignment component and hitch component can be.

The same applies to the relative movability of the insertion connector components relative to the alignment components carrying them. Here as well, in order to achieve the advantages associated with the present invention it can be sufficient in principle if exactly one insertion connector component from among the towing vehicle-side and towed vehicle-side insertion connector components is displaceable relative to the alignment component carrying it. It is advantageous, however, if each of the two insertion connector components is provided, relative to the alignment component carrying it, displaceably thereon. The relative motion paths of the individual insertion connector component relative to the alignment component carrying it can thereby be kept short, and it is nevertheless possible to create a relative movement clearance which is large overall if two insertion connector components are movable relative to one another.

The present invention is nevertheless also expressly intended to encompass the situation in which, when only exactly one alignment component is relatively movable relative to the hitch component carrying it, and furthermore when only exactly one insertion connector component is displaceable relative to the alignment component carrying it, the alignment component of one vehicle from among the towing and towed vehicles is movable relative to the hitch component carrying it, and the insertion connector component of the respective other vehicle is displaceable relative to the alignment component carrying it.

According to an aspect of the present invention, consideration can be given to achieving an insertion connection-preparing alignment of the insertion connector components, by way of a relative motion of the towing vehicle-side and/or towed vehicle-side alignment component relative to the hitch component carrying it, in such a way that the insertion connection can be established, after the insertion connection-preparing alignment of the insertion connector components as a result of the relative motion of the towing vehicle-side and/or towed vehicle-side insertion connector component relative to the alignment component carrying it, directly, for example by a simple relative motion of the towing vehicle-side and/or towed vehicle-side insertion connector component with only one degree of freedom of motion. The towing vehicle-side and/or towed vehicle-side insertion connector component can be displaceable for this purpose, relative to the alignment component carrying it, translationally along a predetermined, preferably straight-line, motion trajectory, or rotationally around a predetermined pivot axis.

Once the insertion connection has been established, the insertion connector configurations of the towing vehicle-side and towed vehicle-side insertion connector components contact one another directly. Once the insertion connection has been established, energy and/or information is transferred between the towing vehicle and towed vehicle directly via the insertion connector configurations. An insertion connector configuration can be a male contact insertion connector, and a further insertion connector configuration matching it can be a female contact socket.

The at least one insertion connector configuration of the towing vehicle-side and/or towed vehicle-side insertion connector component can be provided rigidly thereon. The at least one insertion connector configuration of the towing vehicle-side and/or towed vehicle-side insertion connector component can, however, also be provided on the insertion connector component movably relative to an insertion connector frame thereof, for example in order to enable precise alignment of the towing vehicle-side and towed vehicle-side insertion connector configurations so as to increase the reliability with which the insertion connection is established. For this, the at least one towing vehicle-side and/or towed vehicle-side insertion connector configuration can be coupled to a centering means for motion together. The mutually fitting centering means of the towing vehicle-side and/or towed vehicle-side insertion connector configurations can then bring about the aforesaid precise adjustment during the relative motion of the insertion connector components which brings about establishment of the insertion connection. The insertion connection-preparing alignment previously brought about by the alignment components can then be a coarse alignment. The maximum possible relative motion path of the towing vehicle-side and/or towed vehicle-side insertion connector configuration relative to its respective other insertion connector component is therefore preferably shorter than the maximum possible relative motion path of the towing vehicle-side and/or towed vehicle-side alignment component relative to the hitch component carrying it. This condition is preferably satisfied for the relative motion travel lengths in at least two, particularly preferably in three mutually orthogonal spatial directions.

Furthermore, because of the relative movability of at least one insertion connector component relative to the alignment component carrying it, it is also possible in principle to move the at least one insertion connector relative to the alignment component carrying it, when it is not required for an insertion connection, into a protected neutral position in which it is shielded with respect to external influences.

For example, one insertion connector component from among the towing vehicle-side and towed vehicle-side insertion connector components can be displaceable, relative to the alignment component carrying it, between a retracted connection readiness position and an advanced connection activation position. In the retracted connection readiness position it can be retracted into a protective housing in which it is less readily accessible from outside than in the connection activation position. The connection activation position is usually a position in which, when the respective other insertion connector component is present in operational fashion, the insertion connection is established therewith.

The motion between a connection readiness position and connection activation position can in principle be of any kind, for example a pivoting motion. If necessary, the motion of the insertion connector component between a connection readiness position and connection activation position can also be a combined motion made up of a pivoting motion and translational motion, for example if the physical circumstances in the region around the relevant insertion connector component require such a motion.

A particularly reliable insertion connection having the largest possible contact area for the two participating insertion connector configurations of the towing vehicle and towed vehicle can be established when a contact projection of one insertion connector configuration is introducible along an insertion connection axis into a corresponding contact socket of the respective other insertion connector configuration. For this reason, the motion of the insertion connector component between a connection readiness position and connection activation position is an exclusively translational motion at least in a final motion region containing the connection activation position; preferably, for reasons of maximally simple guidance, it is an exclusively translational motion along the entire motion travel length.

In order to describe the hitching apparatus of the present invention, reference will be made to a reference state in which a towing vehicle and towed vehicle are standing on a common flat horizontal substrate and follow one another in a longitudinal vehicle direction. The longitudinal center vehicle planes of the two vehicles, constituted by the towing vehicle and towed vehicle, are coplanar, so that the longitudinal vehicle directions of the two vehicles also coincide. A "longitudinal vehicle center plane" for purposes of the present Application is a plane that extends in a longitudinal vehicle direction and is orthogonal to the substrate (supporting substrate) on which the vehicle is standing. In case of doubt, the longitudinal vehicle center plane extends through the vehicle in such a way that the wheels of an axle of the vehicle are at the same quantitative distance from it. The aforesaid theoretically ideal initial orientation prior to establishment of the hitched connection can be present in the reference state, and therefore does not contradict it.

Unless stated otherwise in the present Application, this reference state is to be taken as the basis for the description of the hitching apparatus.

In this reference state, the towing vehicle-side and towed vehicle-side hitch components can be caused to approach one another along a hitching trajectory in order to establish the hitched connection, and to move away from one another along the hitching trajectory in order to undo the hitched connection. In the reference state, the hitching trajectory therefore extends parallel to the common supporting substrate and parallel to the coplanar longitudinal vehicle center planes.

A "towing vehicle" for purposes of the present Application is preferably a motor-driven self-propelled towing machine. This need not be the case, however. A "towing vehicle" for purposes of the present Application can be any vehicle onto which a towed vehicle is hitched. In multi-member vehicle combinations, one and the same vehicle can be a towed vehicle in relation to the vehicle that precedes it in the vehicle combination and to which it is hitched, and can be a towing vehicle in relation to a vehicle that comes after it and to which it is hitched. This is relevant, for example, to vehicle combinations having a semi-trailer which is hitched onto a self-propelled towing vehicle and onto which is hitched a dolly onto which in turn a semi-trailer can be hitched. In that case the hitching apparatus according to the present invention can be arranged in particular between the semi-trailer first mentioned and the dolly. This is also relevant, for example, to vehicle combinations in which a center-axle trailer is hitched onto a self-propelled towing vehicle, and a rigid-drawbar trailer is hitched to that trailer. In that case the hitching apparatus can be arranged between the towing vehicle and the center-axle trailer, and/or between the center-axle trailer and the rigid-drawbar trailer.

One possible advantageous consequence of the relative movability of the at least one insertion connector component, from among the towing vehicle-side and towed vehicle-side insertion connector components, relative to the alignment component carrying it is the possibility that the insertion connector component, displaceable between the connection readiness position and the connection activation position, can be displaceable between those positions along a connecting trajectory that is different from the hitching trajectory. This makes possible outstanding utilization of small movement clearances for establishing the insertion connection. Specifically, in contrast to the existing art, the approach motion of the hitch components along the hitching trajectory, performed in order to establish the hitched connection, can be utilized in order to align the alignment components carried by the respective hitch components and, with them, the insertion connector components in turn respectively carrying them, in order to prepare the insertion connection. Although the alignment components of the two vehicles, from among the towing vehicle and towed vehicle, can be caused to approach one another for insertion connection-preparing alignment along a line parallel to the hitching trajectory, the insertion connector component can then, once alignment is accomplished, be displaced between the connection readiness position and the connection activation position along a connecting trajectory that is freely selectable (within predefined boundary conditions) independently of the hitching trajectory. Once such boundary condition is, for example, the accessibility of the respective other insertion connector component, which will always be located with one component remotely from the insertion connector component in a longitudinal vehicle direction.

As already indicated above, the connecting trajectory can be a pivoting motion trajectory around a pivot axis. Preferably, however, the connecting trajectory is a translational, particularly preferably a straight-line translational, trajectory, as is the hitching trajectory in the reference state described above.

As already explained, the substructure of a commercial vehicle can be equipped, below its utility structure, with numerous functional assemblies, including in the vicinity of a hitch component. In order on the one hand to have the ability to arrange the insertion connector component, in its connection readiness position, at a sufficient distance from parts of the hitch component which in some circumstances are highly stressed, for example a coupling jaw that occasionally collides with a towing eye of the towed vehicle upon hitching, and nevertheless to allow the insertion connector component to approach the respective other hitch component and its insertion connector component sufficiently closely for the connection activation position, it is advantageous if the connecting trajectory and the hitching trajectory enclose an angle with one another. Preferably the two trajectories lie in one common plane, although it is not to be excluded that the trajectories can also be oriented askew. Consideration precisely of the reference state characterized above makes it clear, however, that the one insertion connector component can be caused to approach the respective other one particularly efficiently if the connecting trajectory is located in one common plane with the hitching trajectory. In order to achieve a secure hitched connection, and with it an insertion connection, even when the relative position of the hitch components deviates from a theoretically ideal initial orientation as the towing and towed vehicles begin to approach one another, the common plane of the connecting trajectory and hitching trajectory is preferably the longitudinal center plane of the vehicle carrying the insertion connector component. Such deviations from the theoretically ideal initial orientation are to be expected to the same extent on either side of the longitudinal vehicle center plane of the vehicle carrying the insertion connector component. In this case it is immaterial, for example, whether a drawbar, constituting a towed vehicle-side hitch component, is pivoted to one or the other side of the longitudinal vehicle center plane around a line parallel to the yaw axis of the towing vehicle and passing through the towing vehicle-side hitch component. There is then no "preferred side" of the vehicles, on which a greater mutual misadjustment of the hitch components can be corrected by the alignment components than on the respectively opposite side.

In principle, the insertion connector component discussed above can be the towing vehicle-side and/or towed vehicle-side insertion connector component. Preferably, however, the insertion connector component is the towing vehicle-side insertion connector component, since the installation space around the towing vehicle-side hitch component is more greatly restricted by the placement of functional assemblies on the towing vehicle, especially when it is a commercial vehicle, than on a towed vehicle-side hitch component that as a rule protrudes from the towed vehicle.

The ability to displace the insertion connector component along a connecting trajectory different from the hitching trajectory between its positions (connection readiness position and connection activation position) makes possible an advantageous refinement of the present invention according to which the insertion connector component is arranged in a region above the towing vehicle-side hitch component, where particularly little installation space and movement clearance are usually available. The towing vehicle-side insertion connector component can then be arranged, for example, between the towing vehicle-side hitch component and a utility structure located thereabove, for example a loading bed.

The towing vehicle-side insertion connector component can be arranged in a region above the towing vehicle-side hitch component, for example, even when a barrier segment, for example a lower end segment of a load sideboard or an underride guard pivotable around a horizontal axis, is located behind the insertion connector component in a longitudinal vehicle direction. If the connecting trajectory were to extend parallel to the hitching trajectory, either there would be a risk of a collision between the towing vehicle-side insertion connector component and the respective barrier segment upon displacement into the connection activation position, or there would be a risk of a collision between the towed vehicle-side insertion connector component and the barrier segment of the towing vehicle upon hitching of the towed vehicle onto the towing vehicle. Because of the difference between the hitching trajectory and connecting trajectory, however, the towing vehicle-side insertion connector component can be moved from the connection readiness position into the connection activation position with a motion component in a longitudinal vehicle direction toward the towed vehicle located behind the towing vehicle, and with a further motion component toward the substrate of the towing vehicle. Thus either the towing vehicle-side insertion connector component can be moved through below the barrier segment located behind it in the longitudinal vehicle direction, or also the towed vehicle-side insertion connector component can be moved through, upon hitching of the towed vehicle onto the towing vehicle, below the relevant barrier segment which, as a complicating factor, in winter may be covered with ice with which a collision should likewise be avoided.

After completion of insertion connection-preparing alignment by the alignment components, but before establishment of the insertion connection, the towing vehicle-side and towed vehicle-side insertion connector components can be located at different distances from the flat and horizontal supporting substrate of the vehicles. For the reasons recited above, the spacing of the towed vehicle-side insertion connector component from the substrate is then preferably greater than the spacing of the towed vehicle-side insertion connector component from the substrate. The spacing of the towing vehicle-side insertion connector component from the substrate can be greater than that of the towed vehicle-side insertion connector component, for example because in the spacing direction from the substrate, i.e. in the direction of the towing vehicle yaw axis, the towing vehicle-side alignment component is arranged between the towing vehicle-side hitch component and the towing vehicle-side insertion connector component. Conversely, when the towed vehicle-side hitch component is oriented with a substrate-parallel longitudinal center axis of a towed vehicle-side hitch member, in particular a towing eye, the towed vehicle-side insertion connector component can be arranged in a height range above the substrate which overlaps with the height range in which the towed vehicle-side alignment component is arranged.

For maximally exact motion of the insertion connector component, in particular of the towing vehicle-side insertion connector component, along the connecting trajectory, the insertion connector component can be guided movably on a carrying component. A force device that can be arranged on one component from among the insertion connector component and carrying component can be provided as a drive system for the insertion connector component in at least one motion direction between a connection readiness position and connection activation position. In order to achieve physically compact driving of the insertion connector component in at least one direction along the connecting trajectory, the force device is preferably arranged on the carrying component. The force device can furthermore encompass a drive component, guided movably on the carrying component, which is coupled to the insertion connector component for motion transfer.

It can be sufficient in principle if the drive component is coupled in only one of its motion directions to the insertion connector component, for example in order to move the latter from its connection readiness position into the connection activation position. Preferably the drive component is coupled to the insertion connector component for bidirectional motion transfer, so that the drive component can move the insertion connector component in opposite directions along the connecting trajectory and thus into both the connection activation position and the connection readiness position.

In order to allow the available installation space or movement clearance, which as a rule is small, to be used as unrestrictedly as possible for motion of the driving component, the drive component is preferably movable between an initial position and an end position along a drive trajectory different from the connecting trajectory. That drive trajectory is preferably orthogonal to the connecting trajectory. This applies in particular when, in accordance with a preferred refinement, described above, of the present invention, the connecting trajectory is located in the longitudinal vehicle center plane of the vehicle carrying the respective insertion connector component. The drive trajectory can then extend in a transverse vehicle direction. Preferably the motion path of the drive component does not extend beyond the carrying component. In order to achieve maximally unequivocal transfer of the motion of the drive component to the insertion connector component, the force device is preferably embodied and arranged in such a way that the insertion connector component is arranged in the connection readiness position when the drive component is in the initial position, and the insertion connector component is in the connection activation position when the drive component is in the end position.

In principle, the drive trajectory is preferably a straight-line trajectory, although it is not to be excluded that the drive trajectory can be helical, for example if the drive component is part of a spindle drive or worm drive. An undesired unintentional motion of the insertion connector component into the connection activation position can be prevented when the drive component is latchable, at least in the initial position, against a motion toward the end position. This latchability can also be an indirect latchability, for example if the insertion connector component, coupled to the drive component for motion together, is directly latchable in its connection readiness position and the drive component is latchable in the initial position via the insertion connector component. Preferably, however the drive component is directly latchable in its initial position. A latching bar, which is shiftable between a latched position in which it latches the drive component in the initial position against motion toward the end position, and a release position in which it releases the drive component to move toward the end position, can be provided, for example, for this purpose.

In order to allow maximally autonomous latching of the drive component in the initial position to be effected, the latching bar is preferably preloaded into the latched position so that the latching bar can travel, as a result of its preload, into the latched position when the drive component is moved back into the initial position, for example in order to undo a previously established insertion connection. In its latched position the latching bar preferably engages into a recess on the drive component. This positive engagement can then be undone in the release position.

In order to furnish the driving force, the force device can encompass any apparatuses known per se, for example a piston-cylinder arrangement, although the latter requires not only considerable installation space but also an energy supply. The force device can also encompass, as a source of driving force for the drive component, an electric motor, which possibly occupies less installation space than a piston-cylinder arrangement but also requires an energy supply.

The force device therefore preferably encompasses a spring as a source of driving force. That spring is preferably a compression spring which, in the higher potential-energy state, occupies less installation space than a tension spring.

The spring can then be provided interactingly with the drive component, preferably in such a way that the spring, with its spring force, drives the drive component from its initial position into the end position. The spring energy stored in the spring is therefore preferably greater when the drive component is in the initial position than when it is in the end position. The stored spring energy can thus act constantly on the drive component, which is prevented by the aforesaid latching bar from moving toward its end position. Only when the latching bar is shifted into the release position can the spring of the force device relax and, in that context, convert the potential energy previously stored in it into kinematic energy of the drive component.

Preferably the hitching apparatus of the present Application is embodied in such a way that once an insertion connection is established, it is maintained as long as the hitched connection of the hitch components is also maintained. A design achieving this can be implemented by the fact that the drive component is indirectly or directly coupled to the hitch component carrying it, in such a way that a releasing motion of a hitch member of the hitch component, for example a hitch bolt, to undo the hitched connection to the respective other hitch component, brings about a motion of the drive component into the initial position. In the case of a direct coupling of the drive component to the hitch component, a direct motion-transferring connection exists between the hitch component and drive component, for example by way of a linkage, a control cable, or a transmission. An indirect coupling of the drive component to the hitch component can be accomplished, for example, by the fact that the hitch member of the hitch component and the drive component are each directly coupled to a shared motion drive, so that when the motion drive drives the hitch member to undo the hitched connection, that motion drive also drives the drive component to move back into the initial position. The motion drive can be used in that context to load the aforementioned spring back into the initial position with the motion of the drive component.

The hitched connection between the hitch components can be accomplished in nonpositively and/or positively engaging fashion, a positive engagement between the towing vehicle-side and towed vehicle-side hitch components being preferred because of the connection reliability thereby achieved. For example, the towing vehicle-side hitch component can comprise a hitch bolt or a hitching ball as a hitch member, and the towed vehicle-side hitch component can comprise as a hitch member a towing eye through which the hitch bolt can pass, or a hitch socket placeable onto the hitching ball. Because of the envisaged usability of the hitching apparatus discussed here even in the sector of heavy commercial vehicles, i.e. commercial vehicles having a permissible total weight of more than 12 tonnes, a bolt hitch is preferred as a towing vehicle-side hitch component. A drawbar having a towing eye is consequently preferred as a towed vehicle-side hitch component.

In order to increase the relative movement clearance of the towing vehicle-side alignment component relative to the towing vehicle-side hitch component, the alignment component is preferably provided on the coupling jaw of the towing vehicle-side hitch component. Because the coupling jaw itself can in turn exhibit relative movability with respect to a hitch body of the towing vehicle-side hitch component which receives the towing vehicle-side hitch member, the relative movability of the towing vehicle-side alignment component relative to a towing vehicle-mounted segment of the towing vehicle-side hitch component can be the sum of the relative movability of the towing vehicle-side alignment component relative to the coupling jaw and the relative movability of the coupling jaw relative to the towing vehicle-mounted segment of the hitch component.

As has already been set forth above, the relative movability of the at least one insertion connector component relative to the alignment component carrying it can be used to protect the insertion connector component from external influences when not in use. Provision can be made for this purpose that the insertion connector component, from among the towing vehicle-side and towed vehicle-side insertion connector components, preferably the towed vehicle-side insertion connector component, is displaceable, relative to the alignment component carrying it, between a stowage position in which its at least one insertion connector configuration is not accessible for establishment of an insertion connection, and a connection awaiting position in which its at least one insertion connector configuration is accessible for establishment of an insertion connection. The inaccessibility of the insertion connector configuration for establishment of an insertion connection when the insertion connector component is in the stowage position can be achieved, for example, by the fact that when the insertion connector component is in the stowage position, a contacting side of the insertion connector configuration which, when the insertion connection is established, is contacted by the insertion connector configuration of the respective other insertion connector component, is concealed behind a panel or cover; or that in the stowage position, the insertion connector component is located in a housing or partial housing that externally shields the insertion connector component or at least its insertion connector configuration. In its stowage position, the insertion connector component, in particular a wall segment thereof, can advantageously supplement the partial housing to yield a housing.

Inaccessibility of the insertion connector configuration for establishment of an insertion connection is to be assumed, for example, whenever a physical barrier prevents an approach motion by a freely movable matching further insertion connector configuration toward the insertion connector configuration, whereas without the physical barrier an insertion connection would in principle be capable of being established.

Preferably the insertion connector component is preloaded into the stowage position so that the insertion connector component can be in the stowage position whenever no external forces and/or moments are acting on it.

In principle, the motion of the insertion connector component between the stowage position and the connection awaiting position can once again be any motion, for example a translational motion, in the course of which a covering component initially covering the insertion connector configuration is moved, for example pivoted, out of the motion path of the insertion connector component, in particular by the insertion connector component itself, so that after removal of the covering component, for example by swinging aside, the previously inaccessible insertion connector configuration of the insertion connector component is accessible for establishment of an insertion connection.

Rapid motion of the insertion connector component from the stowage position into the connection awaiting position with a short motion path can advantageously be achieved by the fact that the insertion connector component is pivotable between the stowage position and the connection awaiting position. In principle, the pivotability of the insertion connector component can be overlain with a translational movability thereof. In order to allow particularly short motion paths, and thus rapidly executable motions of the insertion connector component between the stowage position and connection awaiting position, to be implemented, the insertion connector component is preferably exclusively pivotable between the aforesaid positions. In order to implement the pivoting motion of the insertion connector component between the aforesaid positions as independently as possible of an approach motion of the insertion connector components participating in the desired insertion connection, the pivoting motion of the insertion connector component preferably proceeds around a pivot axis that is orthogonal to the relative motion direction along which the towing vehicle-side and towed vehicle-side insertion connector components can be caused to approach one another in order to establish the insertion connection, and can be moved away from one another in order to undo it. When the participating vehicles are in the aforementioned reference state, the pivot axis as a rule extends in a transverse vehicle direction, i.e. in the direction of the pitch axis. The pivoting movability of the insertion connector component around that pivot axis can then serve to compensate for pitching motions of the towing vehicle and towed vehicle relative to one another in the vehicle combination when the insertion connection is established.

If the insertion connector component that is displaceable between the stowage position and connection awaiting position is the towed vehicle-side insertion connector component, which is then provided on a drawbar as a towed vehicle-side hitch component, that drawbar can as a rule be pivotable around a line parallel to the yaw axis of the towed vehicle so that the orientation of the pivot axis of the insertion connector component can change in order to pivot between a stowage position and a connection awaiting position as a function of the pivot position of the drawbar. Preferably, however, regardless of the pivot position of the drawbar relative to the towed vehicle, the pivot axis is parallel to the substrate of that vehicle, from among the towing vehicle and towed vehicle, which carries the insertion connector component.

Preferably the insertion connector component that is displaceable, in particular pivotable, between the stowage position and the connection awaiting position is the towed vehicle-side insertion connector component. This is because the insertion connector component on the towed vehicle-side hitch component is more greatly exposed when not in use, for example when the towed vehicle is parked in a parking area, than a towing vehicle-side insertion connector component, which is often covered beneath a utility structure of the vehicle and possibly also covered laterally by functional assemblies that are arranged in the substructure of the vehicle on the vehicle frame.

Because the towing vehicle-side insertion connector component is preferably located farther from the substrate than the towed vehicle-side insertion connector component after the completion of insertion connection-preparing alignment by the alignment components but before establishment of the insertion connection, the towed vehicle-side insertion connector component pivots, preferably away from the substrate, from the stowage position into the connection awaiting position so that, for example, the distance between the towed vehicle-side insertion connector configuration and the substrate increases.

To ensure that the insertion connector component can reach the connection awaiting position in reliably and definably repeatable fashion, the insertion connector component is preferably received on a receiving component in movably guided fashion relative thereto. The receiving component can be part of the housing or partial housing in which the insertion connector component is received in the stowage position. Motion guidance can be effected by a pivot axle or pivot shaft that is received on the receiving component.

To avoid unnecessary occupation of installation space and unnecessary weight, the receiving component can be a shell component that, when the insertion connector component is in the stowage position, surrounds that component at least in portions. For example, the receiving component can engage around the insertion connector component at the bottom and sides in a U-shape, while the receiving component is open toward the top so that the insertion connector component can pivot upward, proceeding from its stowage position, out of the receiving component into the connection awaiting position.

Reliable, quick, and accurately repeatable mechanical control of the motion of the insertion connector component between the stowage position and connection awaiting position can be achieved by the fact that there is provided on the receiving component a guidance component that is movable both relative to the receiving component and relative to the insertion connector component, is guided on the receiving component movably along a guidance trajectory between a starting position and a final position, and is coupled to the insertion connector component for motion together in such a way that the insertion connector component is in the stowage position when the guidance component is in the starting position, and the insertion connector component is in the connection awaiting position when the guidance component is in the final position.

Preferably the guidance component is movable translationally relative to the receiving component, particularly preferably movable only translationally, so that the guidance component can be received as a slide in the receiving component. This results in a particularly low requirement for installation space.

The guidance component movable exclusively translationally on the receiving component can also, and specifically, be used when the insertion connector component itself is displaceable exclusively rotationally between the stowage position and connection awaiting position.

For example, one component from among the insertion connector component and guidance component can comprise a projection that interacts with a guidance gate, for example a guidance groove, on the respective other component in such way that a motion of the guidance component from the starting position into the end position results in a motion of the insertion connector component from the stowage position into the connection awaiting position. In simple cases, the return motion of the insertion connector component back into the stowage position can occur in gravity-driven fashion or can be accomplished by a preloading means, such as a spring, without guidance by the guidance component. Preferably, however, in order to ensure defined bidirectional motion of the insertion connector component between the stowage position and connection awaiting position, the motion from the connection awaiting position into the stowage position is also guided by the guidance component.

This can be achieved, by engagement of the aforementioned projection into a guidance groove having two mutually oppositely located groove flanks, if the one groove flank interacts with the projection upon motion of the insertion connector component in the one direction, and if the respective oppositely located groove flank interacts with the projection upon motion back in the opposite direction.

In order to avoid undesired bracing torques that can occur upon guidance by the guidance component of the motion of the insertion connector component between the stowage position and connection awaiting position, it is preferred if the guidance component receives the insertion connector component between two guidance limbs, provided at a distance from one another, of the guidance component, the insertion connector component being coupled and guided, at each side located oppositely from a guidance limb of the guidance component, by the guidance component for motion together. On each side, located oppositely from a guidance limb of the guidance component, of the insertion connector component, for example, a projection on one of the components from among the insertion connector component and guidance component can interact for motion coupling with a guidance gate, in particular a guidance groove, on the respective other component. Preferably the guidance component is arranged between the receiving component and insertion connector component. For stability reasons, the guidance component is particularly preferably also U-shaped, and engages around the insertion connector component on three sides.

In principle, consideration can be given to deriving the motion of the insertion connector component out of the stowage position into the connection awaiting position from the motion of the respective other insertion connector component out of the connection readiness position into the connection activation position, or vice versa. This means that the drive energy required for the motions of the two insertion connector components are supplied by the motion drive of one insertion connector component, and the two insertion connector components each comprise one part of an auxiliary coupling mechanism that transfers the drive energy from one insertion connector component to the other insertion connector component.

Alternatively, however, it is also possible to utilize the motion of the hitch components relative to one another, upon hitching, in order to derive therefrom the motion energy for one or both insertion connector components. For example, the insertion connector component previously discussed can be conveyed by the guidance component from the stowage position into the connection awaiting position, in which context the guidance component, in order to initiate a motion that is transferred from the guidance component to the insertion connector component, can comprise an abutment segment that is embodied for abutment against a counter-abutment component of that vehicle, from among the towing vehicle and towed vehicle, which carries the respective other insertion connector component. That counter-abutment component is preferably the hitch component or the alignment component. Because the alignment components of the two vehicles (towing vehicle and towed vehicle) in particular are aligned relative to one another, and for that purpose come into abutment against one another, the abutment segment is particularly preferably embodied for abutment against the alignment component of the respective other vehicle.

As the alignment components of the two vehicles approach one another, the abutment segment can thus come into abutment against a component of the respective other vehicle. As the two hitch components continue to approach one another, the guidance component can then be moved relative to the receiving component and thus also relative to the insertion connector component, and with its relative motion it can effect, as a result of the previously described motion coupling, a motion of the insertion connector component between its two aforesaid positions. For that purpose, the motion resistance of the relative motion of the guidance component relative to the receiving component from the starting position into the final position is preferably lower than a motion resistance of any relative motion of the receiving component in the same direction relative to the hitch component, if such a relative motion of the receiving component is provided.

A further result produced thereby that the insertion connector component is moved out of the stowage position as late as possible, i.e. only after a predetermined approach toward the insertion connector component of the respective other vehicle has occurred. The insertion connector component can thus be caused to approach the insertion connector component of the respective other vehicle in well-protected fashion, and can be moved through below obstacles, for example an underride guard that may additionally be loaded with ice, with no risk of a collision between the insertion connector component and the obstacle.

As already discussed above, provision can be made, in order to protect at least one insertion connector configuration of the insertion connector component, that when the insertion connector component is in its stowage position, the insertion connector configuration is located behind a covering component in a sliding-on direction. The sliding-on direction here is the direction in which an insertion connection to the insertion connector component can theoretically be established on the basis of the design, regardless of whether that insertion connection can in fact be established when the insertion connector component is in the respective position.

Preferably the insertion connection can be established exclusively by way of an approaching motion of the insertion connector components toward one another, with no direct mutual latching or similar positional securing of the towing vehicle-side and towed vehicle-side insertion connector components once the insertion connection is established.

In order to minimize the number of components needed in order to constitute the hitching apparatus being discussed here, provision can be made that the covering component comprises, preferably on its side facing away from the insertion connector component when the latter is in the stowage position, the alignment configuration of the alignment component carrying the insertion connector component. In principle, for easier mutual alignment of the two alignment components, provision can be made that the alignment configuration of the one alignment component from among the towing vehicle-side and towed vehicle-side alignment components comprises an alignment projection tapering toward its free longitudinal end, and the alignment configuration of the respective other alignment component comprises an alignment recess, complementary at least in portions to the alignment projection, which widens towards its free longitudinal end and constitutes an alignment jaw, the alignment projection being embodied for introduction into the alignment recess. As a result of the relative movability of the at least one insertion connector component relative to the alignment component carrying it, the opening angle of the alignment jaw and the taper angle of the alignment projection can be selected to be comparatively large, for example greater than 60° or even greater than 90°.

If the covering component comprises the alignment configuration, said component is connected to the receiving component preferably rigidly, in particular integrally intermaterially. The receiving component and the covering component can then constitute the alignment component.

In physical terms, the alignment projection can have a conical and/or frustoconical and/or tetrahedral and/or pyramidal and/or generally polyhedral tapering shape, and the alignment recess can have a corresponding negatively conical and/or negatively frustoconical and/or negatively tetrahedral and/or negatively pyramidal and/or generally negatively polyhedral tapering shape. In the case of generally polyhedral tapering shapes for the alignment projection, the latter can also exhibit several taper angles in different planes, in which case preferably no taper angle is smaller than 45°, preferably smaller than 60°, so as to obtain an alignment projection that is as short as possible but nevertheless effective even with a short motion path.

For reliable and lasting alignment of the towing vehicle-side and towed vehicle-side alignment components as preparation for the establishment and maintenance of an insertion connection, it is advantageous if the towing vehicle-side and towed vehicle-side alignment components are fastenable to one another. According to a preferred design variant, provision can be made for that purpose that upon reaching or exceeding a predetermined approach to one another, in particular upon reaching or exceeding a predetermined introduction depth of the alignment projection into the alignment recess, the towing vehicle-side and towed vehicle-side alignment components are lockable against being removed from one another.

In principle, it is not to be excluded that locking of the two alignment components against being removed from one another is accomplished by a manual locking actuation. Preferably, however, the alignment components are unassistedly lockable against being removed from one another.

In order to implement the locking of the alignment projection and alignment recess against being removed from one another, one alignment component from among the towing vehicle-side and towed vehicle-side alignment components can comprise a locking shackle or a locking eye. Preferably the locking shackle spans a recess into which a locking member of the respective other alignment component can be moved for engagement behind the locking shackle. In order to achieve maximum stability, the locking shackle is retained at its two longitudinal ends, or at the longitudinal end regions containing the longitudinal ends, on the alignment component carrying it. In the interest of simple installation, the locking shackle or locking eye is provided on the alignment component comprising the alignment projection, preferably at that longitudinal end of the alignment projection which is at the front in the approach direction of the alignment projection toward the alignment recess.

The respective other component from among the towing vehicle-side and towed vehicle-side alignment components can then comprise a locking bolt or locking hook that is embodied and arranged to engage positively behind the locking shackle or locking eye.

In order to establish a locking engagement with the locking shackle or locking eye, the locking hook is preferably movable, in particular pivotable, between an introduction position in which the locking shackle or locking eye is introducible past a hook limb of the locking hook in an introduction direction into a hook jaw, and a locked position in which the hook limb engages behind the locking shackle, which is then located in the hook jaw, or behind a segment of the locking eye located in the hook jaw, and thereby secures the locking shackle or locking eye against being pulled out oppositely to the introduction direction. In the case in which a locking eye is used, the latter is preferably passed through by the locking hook in its locked position in order to achieve a positive engagement as effective pullout prevention.

For simple unassisted locking of the alignment projection and alignment recess against removal from one another, the locking hook can comprise a tripping limb that, during the motion of the locking hook from its introduction position into its locked position, shifts the latching bar from its latched position into its release position.

For reasons of stability, the tripping limb is preferably embodied in one piece with the aforesaid hook limb, and the tripping limb and hook limb, together with a base connecting the tripping limb and hook limb, encompass between them the aforesaid hook jaw. In order to facilitate shifting of the latching bar by the tripping limb, the latter can exhibit a greater longitudinal dimension, proceeding from the base of the locking hook which connects the tripping limb and the hook limb, than the hook limb that engages behind the locking shackle or passes through the locking eye. When the hook limb is embodied to be shorter than the tripping limb, the locking eye can be embodied with a smaller diameter, and the receiving space, located behind the locking shackle oppositely to the introduction direction, for the hook limb can be made shorter since, in particular with the preferred pivoting motion of the locking hook, a shorter hook limb is easily and reliably introducible into, and removable again from, even smaller receiving spaces.

The aforementioned preferred unassisted lockability of the alignment components against removal from positive engagement with one another can be achieved in simple but effective fashion by the fact that once the predetermined approach of the alignment components to one another is achieved, the aforementioned locking shackle or locking eye comes into abutment against a trigger component that, as the approach motion continues beyond the predetermined approach, is moved along by the abutting engagement established with the locking shackle or locking eye, and can thus bring about a motion of the locking member into a position that engages behind the locking shackle or passes through the locking eye. The trigger component can release the motion of the locking member in tripping fashion, or can in fact drive the locking member to execute the motion or transfer the approach motion of the locking shackle or locking eye to the locking member as a drive motion. If the aforementioned hook limb is the locking member, for example, the tripping limb can be the trigger component. The hook limb and tripping limb are then preferably pivotable around one common pivot axis.

With the aforementioned tripping limb, the introduction motion of the alignment projection into the alignment jaw can advantageously be used to release the drive component that is preferably fastened by the latching bar in its latched position. It is thus possible, when the alignment components of the towing vehicle and towed vehicle have approached one another to a predetermined extent so that unassisted latching of the two alignment configurations to one another is triggered, to release the drive component, simultaneously with that latching, for motion out of its initial position into its end position. As a consequence, with the predetermined approach of the alignment configurations to one another not only is it possible to achieve securing of the two alignment configurations against removal from one another, but it is thereby also possible to initiate a displacement of the insertion connector component, coupled to the drive component for motion together, from the connection readiness position into the connection activation position.

Not only can the tripping limb of the locking hook shift the latching bar into its release position during the motion of the locking hook from its introduction position into its locked position, but with a suitable conformation of the latching bar, the latching bar can secure the locking hook in its locked position against motion back into its introduction position. For this, a segment of the latching bar can come into abutting engagement with a segment of the tripping limb, so that the latching bar segment physically prevents the tripping limb, and with it the entire locking hook, from moving away from its locked position toward its introduction position. Preferably the latching bar is embodied to be so short, in a shifting direction of the locking hook from the introduction position into the locked position, that the tripping limb moves beyond that longitudinal end of the latching bar which is closer to it in the locked position, so that the latching bar can come into abutting engagement, with its longitudinal end closer to the tripping limb in the latter's locked position, against its flank facing toward the oppositely located hook limb. This abutting engagement is assisted by the preferred preloading of the latching bar in its latched position. For this purpose, the latching bar is preferably arranged pivotably in such a way that one latching bar segment is located on either side of the latching-bar pivot axis, such that a latching bar segment located on one side of the latching-bar pivot axis fastens the drive component in its initial position, and the latching bar segment located on the other side of the latching-bar pivot axis is actuatable by the tripping limb to shift the latching bar into the release position and secures the tripping limb in the locked position of the locking hook against a motion toward the introduction position when the latching bar is in the latched position. The pivot axis of the latching bar preferably passes through it orthogonally.

Alternatively, when the locking hook is in the locked position the tripping limb can engage into a recess of the latching bar so that the latching bar, at least when it is in the latched position, can thereby also secure the tripping limb against motion from its locked position toward its introduction position.

Highly advantageously, the hitching apparatus embodied as described here does not require any pivotability of the towing vehicle-side insertion connector component or of the towing vehicle-side alignment component around that turning axis of the vehicle combination around which the towed vehicle-side hitch component can pivot, relative to the towing vehicle-side hitch component, when the hitched connection is established. Such pivotability is required, for example, in the hitching apparatus known from EP 0 434 472 A1 in order to enable problem-free turning of the vehicle combination constituted from the towing vehicle and towed vehicle even when the insertion connection is established. This turning axis is often a longitudinal center axis, parallel to the yaw axis, of the towing vehicle-side hitch member, for example a hitch bolt. Elimination of this boundary condition that must be observed in the existing art substantially increases the design freedom of engineers in terms of configuring the hitching apparatus according to the present invention.

The alignment configuration of the towing vehicle-side alignment component can instead be provided at a distance from a longitudinal center axis of a towing vehicle-side hitch component, for example a hitch bolt, which enables optimum utilization of the installation space around the towing vehicle-side hitch component. The longitudinal center axis of the towing vehicle-side hitch member, in the case in which the latter is embodied as a hitch bolt, is as a rule oriented parallel to the yaw axis of the towing vehicle. In those cases in which the towing vehicle-side hitch member does not have an unequivocal longitudinal center axis because of its conformation, for example in the case of a hitching ball of a ball hitch, a longitudinal center axis passing through the hitch member parallel to the yaw axis of the towing vehicle is to be assumed to be the longitudinal center axis of the hitch member in the reference state characterized above. Those skilled in the art will always consider a towing vehicle-side hitch member in terms of its orientation relative to the towing vehicle, even in the incompletely installed state.

When the introduction motion, starting from the beginning of a hitching operation for establishing a hitched connection, of the towing vehicle-side and towed vehicle-side hitch components into one another, along an approach track along which the hitch components approach one another during the hitching operation, is shorter than the introduction motion of the towing vehicle-side and towed vehicle-side hitch component segments into one another, the approach motion of the towing vehicle-side and towed vehicle-side hitch components toward one another can advantageously be used for drive purposes to establish the positive engagement between the towing vehicle-side and towed vehicle-side alignment components. This is because the positive engagement between the towed vehicle-side and towing vehicle-side alignment components can then be completely established during the approach motion of the towing vehicle-side and towed vehicle-side hitch components toward one another, and can be derived completely from that motion. At least the alignment configuration of the towing vehicle-side alignment component is therefore preferably provided at a distance from the longitudinal center axis of the hitch member in the longitudinal towing-vehicle direction, specifically in a direction toward the towed vehicle. This is a direction that corresponds to the recognizable approach direction of the towing vehicle-side coupling component toward the towed vehicle-side coupling component in the context of establishment of a hitched connection. Because the stationary towed vehicle is usually hitched onto the towing vehicle via straight-line reverse travel of the latter, the alignment configuration is provided particularly preferably at a distance from the longitudinal center axis of the hitch member only in the longitudinal towed-vehicle direction or only in the aforementioned approach direction. The towing vehicle-side alignment configuration is thus preferably provided with an offset toward the towed vehicle relative to the longitudinal center axis of the towing vehicle-side hitch member.

According to a concrete preferred embodiment of the hitching apparatus according to the present invention, the towing vehicle-side hitch component encompasses:
- a hitch body having a receiving space for receiving a towed vehicle-side hitching eye;
- a hitch bolt that is displaceable along its longitudinal center axis between a hitched position in which it protrudes farther into the receiving space and a disengagement position in which it protrudes less far into the receiving space; and
- a coupling jaw that is pivotable relative to the hitch body around the longitudinal center axis of the hitch bolt, the towing vehicle-side alignment component preferably being provided on the coupling jaw for pivoting motion together therewith around the longitudinal center axis of the hitch bolt. The arrangement of the towing vehicle-side alignment component on the coupling jaw for pivoting motion together therewith on the one hand makes possible a stable and secure placement base for the alignment component simultaneously with movability thereof around the longitudinal center axis of the hitch bolt, which allows a vehicle combination constituted from a towing vehicle and towed vehicle to turn, with an insertion connection established, without damage to alignment components or insertion connector components on the towing or towed vehicle as a result of the turning operation. As a rule, the coupling jaw is arranged on the hitch body in such a way that, when the hitched connection is established, pivoting of the hitch body around the longitudinal center axis of the hitch bolt occurs only after a limit pivot angle, predetermined by the configuration of the hitch body and drawbar, of the drawbar relative to the hitch body has been exceeded. As long as the pivot angle remains below the limit, the coupling jaw behaves as if it were rigidly connected to the hitch body.

According to a preferred embodiment of the present invention, the towing vehicle-side hitch component can thus be constituted by a bolt hitch; the towed vehicle-side hitch component can accordingly encompass a drawbar having a towing eye provided thereon.

In order to ensure that a constituted vehicle combination can travel, with an insertion connection established, over speed bumps and small rises, i.e. generally over substrate surfaces that are curved parallel to the pitch axis of the towing vehicle, without thereby damaging one of the insertion connector components involved in the insertion connection or an alignment configuration, provision is preferably made that the alignment configuration of the towing vehicle-side alignment component is provided pivotably around a pitch alignment axis that is orthogonal to the longitudinal center axis of a hitch member, in particular a hitch bolt, and/or is parallel to the pitch axis of the towing vehicle.

The pitch alignment axis thus proceeds both orthogonally to the longitudinal center axis of the hitch member and orthogonally to an approach direction of the towing vehicle-side and towed vehicle-side hitch components upon establishment of a hitched connection when the towing and towed vehicles approach one another with mutually coplanar vertical longitudinal center planes on a flat horizontal substrate.

In particular, but not only, when the alignment configuration of the towing vehicle-side alignment component is arranged with an offset from the longitudinal center axis of the towing vehicle-side hitch member in the approach direction of the towing vehicle-side hitch component toward the towed vehicle-side hitch component upon hitching, it is advantageous if the alignment configuration of the towing vehicle-side alignment component is displaceable along the vertical axis or yaw axis of the towing vehicle. This too makes possible relative motions between the alignment components and the hitch components that respectively carry them, so that pitching motions of the towing and towed vehicles relative to one another are possible when the hitched connection is established, without possibly resulting in damage to an insertion connection that is likewise established, or to the alignment configurations of the towing vehicle and towed vehicle which are in positive engagement.

In order to allow a positive engagement to be established between the towing vehicle-side and towed vehicle-side alignment configurations during establishment of a hitched connection, despite the displaceability of the towing vehicle-side alignment configuration along the yaw axis of the towing vehicle, it is furthermore advantageous if the alignment configuration of the towing vehicle-side alignment component is displaceable along the vertical towing-vehicle axis against the preload force of a preload device, since the preload device can then always, after abolition of the hitched connection, return the alignment configuration into a defined initial position or neutral position to which the towed vehicle-side alignment configuration can be preadjusted for successful establishment of a positive engagement with the towing vehicle-side alignment configuration.

A neutral position of the towing vehicle-side alignment configuration, which the latter assumes when it is free of the influence of external forces and moments (aside from the preload device), is preferably not located at the end of the relative motion path of the alignment configuration relative to the hitch component, so that the towing vehicle-side alignment configuration can be displaceable, starting from the neutral position and relative to the towing vehicle-side hitch component carrying it, in opposite directions along the vertical towing-vehicle axis.

In physical terms this can be achieved in space-saving fashion by the fact that the preload device encompasses two coaxial springs, preferably overlapping one another at least in portions, which define the neutral position of the towing vehicle-side alignment configuration, each of which preloads the alignment configuration in a different one of two opposite directions along the vertical towing-vehicle axis. It is specifically the overlapping arrangement of the springs which ensures an advantageous preload force in opposite directions along the vertical towing-vehicle axis while occupying little installation space.

In order to ensure a maximally defined relative motion of the towing vehicle-side alignment configuration along the vertical towing-vehicle axis relative to the towing vehicle-side hitch component, the towing vehicle-side alignment configuration can be guided along a plurality of parallel guidance devices, arranged at a distance from one another, for motion along the vertical towing-vehicle axis. Preferably the towing vehicle-side alignment configuration is located between at least two guidance devices in order to save further installation space. In principle, guidance rails and the like can be used as guidance devices. In simple and effective fashion, the guidance devices can encompass guidance rods that pass through guided segments of the towing vehicle-side alignment component and can thus ensure maximally precise guidance of the towing vehicle-side alignment configuration or of the entire towing vehicle-side alignment component. Although any plurality of guidance devices can be provided, the provision of two parallel guidance devices, in particular guidance rods, is sufficient. The guidance rods are preferably arranged, at a distance from one another, orthogonally to the vertical towing-vehicle axis and also orthogonally to the approach direction of the towing vehicle-side and towed vehicle-side hitch components upon establishment of a hitched connection. This means that when the towing vehicle-side hitch component is fully installed on the towing vehicle, the guidance devices are preferably arranged at a distance from one another along a line parallel to the pitch axis of the towing vehicle.

In order to ensure pivotability of the towing vehicle-side alignment configuration around the pitch alignment axis, a respective pivot joint is preferably guided on each guidance device shiftably along the vertical towing-vehicle axis, said joint permitting a rotation around at least one axis that is orthogonal to the vertical towing-vehicle axis, preferably orthogonal both to the vertical towing-vehicle axis and to the approach direction of the towing vehicle-side and towed vehicle-side hitch components upon establishment of a hitched connection.

In order to avoid distortions in the guidance device, it is preferred if each of the pivot joints, guided shiftably on a guidance device, permits a rotation around two rotation axes orthogonal both to one another and to the vertical towing-vehicle axis. In particularly simple physical terms, the pivot joint can be implemented, with little outlay in terms of installation space, as a ball joint. Preferably each of the guidance devices therefore passes through a pivot joint ball that is guided on the guidance device shiftably along the vertical towing-vehicle axis.

Alternatively or additionally, the at least one guidance device can be pivotable around the pitch alignment axis and the alignment configuration can be displaceable thereon translationally, preferably exclusively translationally. Preferably the guidance device is preloaded into a neutral position in which it guides the alignment configuration along the vertical towing-vehicle axis.

Although it can be sufficient in principle to preload, by way of a preload device, only one pivot joint on only one guidance device into a neutral position from which the pivot joint, and with it the towing vehicle-side alignment configuration, is displaceable along the vertical towing-vehicle axis, considerably greater, and therefore preferred, guidance reliability is achieved if, on each guidance device, the respective pivot joint is displaceable by one respective preload device out of a neutral position, respectively against preload force in opposite directions along the vertical towing-vehicle axis.

The statements made above regarding the relative movability of the towing vehicle-side alignment configuration relative to the towing vehicle-side hitch component also apply to the relative movability of the towing vehicle-side alignment component as a whole relative to the towing vehicle-side hitch component, and also apply to the towing vehicle-side insertion connector component carried by the towing vehicle-side alignment component. The towing vehicle-side insertion connector component can be movable relative to the alignment component carrying it, but in accordance with the preferred refinement of the present invention discussed previously, this is a relative motion that is overlaid on a relative motion of the towing vehicle-side alignment component relative to the towing vehicle-side hitch component.

The relative movability of the towing vehicle-side alignment configuration relative to the towing vehicle-side hitch component is identical to the relative movability of the towing vehicle-side alignment component relative to the hitch component carrying it if the towing vehicle-side alignment configuration is immovable relative to the remainder of the towing vehicle-side alignment component, i.e. for example is connected rigidly to an alignment frame that carries it. It is not to be excluded, however, that in order to avoid damage to the towing vehicle-side alignment configuration, for example upon establishment of positive engagement with the towed vehicle-side alignment configuration, the towing vehicle-side alignment configuration is received on an alignment frame of the remainder of the towing vehicle-side alignment component, movably relative thereto.

When it is stated that the towing vehicle-side alignment component is movable relative to the towing vehicle-side hitch component, this moreover expressly includes the case in which the towing vehicle-side alignment component is movable relative to a component of the towing vehicle-side hitch component, for example the coupling jaw, which is itself in turn movable relative to further components of the towing vehicle-side hitch component which, in the fully installed state, are mounted, in an operational state and as intended, on the towing vehicle frame immovably relative thereto. This applies correspondingly to the towing vehicle-side insertion connector component carried by the towing vehicle-side alignment component, since, as already set forth above, its relative movability relative to the towing vehicle-side alignment component is overlaid on the relative movability of the alignment component relative to the towing vehicle-side hitch component.

The arrangement, particularly advantageous in the context of the hitching apparatus according to the present invention, of the towing vehicle-side insertion connector component at a distance from a longitudinal center axis of a hitch member of the towing vehicle-side hitch component, in particular the preferred arrangement of the towing vehicle-side alignment component on the coupling jaw, can be made possible, for example, by the fact that the towed vehicle-side insertion connector component and/or the towed vehicle-side alignment component are arranged rotationally movably relative to the towed vehicle-side hitch component, in particular relative to a drawbar thereof, in each case around two mutually parallel insertion connector rotation axes arranged at a distance from one another and extending in a vertical direction of the towed vehicle-side hitch component, and are arranged translationally movably along a trajectory orthogonal to the insertion connector rotation axes.

In the reference state, with the longitudinal axis of the towed vehicle-side hitch component additionally oriented parallel to the supporting substrate, the vertical direction of said component extends orthogonally to its longitudinal axis and orthogonally to the supporting substrate of the towed vehicle, i.e. parallel to the yaw axis of the towed vehicle. For clarification, the longitudinal axis of the hitch component then extends parallel to the longitudinal axis of the towed vehicle.

The above-described relative movability of the towed vehicle-side insertion connector component and/or of the towed vehicle-side alignment component relative to the towed vehicle-side hitch component makes possible a relative rotation, over a wide range, of the towed vehicle-side hitch component around the longitudinal center axis of the towing vehicle-side hitch member, such as that which occurs, for example, as the vehicle combination travels around a curve, even though the alignment components that are in positive engagement with one another, and/or the insertion connector components connected to one another in the insertion connection, of the towing and towed vehicles are pivotable relative to the (hitch-connected) hitch components around a different turning axis, parallel to the yaw axis, relative to the towed vehicle-side hitch component than the towing vehicle-side and towed vehicle-side hitch components relative to one another. This turning can therefore occur, while an insertion connection is established, with no risk of damage to one of the two insertion connector components. This relative movability of the towed vehicle-side insertion connector component and/or of the towed vehicle-side alignment component relative to its hitch component affords the designer of the hitching apparatus the freedom to arrange the towing vehicle-side insertion connector component, and with it, if applicable, also the towing vehicle-side alignment component with its alignment configuration, independently of the location of the longitudinal center axis of the towing vehicle-side hitch member. It is thereby possible, for example, to decrease the overall height of the hitching apparatus as compared with the existing art, according to which the towing vehicle-side alignment component having the insertion connector component is penetrated by the longitudinal center axis of the hitch component, around which axis it is rotatable.

The indicated advantageous relative movability of the towed vehicle-side insertion connector component and/or of the towed vehicle-side alignment component relative to its hitch component furthermore offers the possibility of mounting the towing vehicle-side and towed vehicle-side insertion connector components on their respective hitch components in "mounted" fashion, i.e. thereabove, and not, for example as in the existing art characterized previously, in suspended fashion, i.e. therebelow; this considerably increases the ground clearance of the vehicles equipped with the hitching apparatus according to the present invention.

In accordance with an embodiment, for example, the advantageous relative movability of the towed vehicle-side insertion connector component and/or of the towed vehicle-side alignment component relative to the towed vehicle-side hitch component can be achieved by the fact that the distance between the two parallel insertion connector rotation axes is modifiable as a result of the translational movability of the towed vehicle-side insertion connector component and/or of the towed vehicle-side alignment component. The two insertion connector rotation axes can likewise, with no change in distance, be arranged, translationally together relative to the towed vehicle-side hitch component, translationally movably thereon.

Also conceivable is a mixed form of these two solutions, according to which both insertion connector rotation axes are arranged, translationally together relative to the towed vehicle-side hitch component, movably thereon, but their distance from one another is also modifiable. When the insertion connection is established, the towing vehicle-side and towed vehicle-side insertion connector components can thus be movable together, relative to the towed vehicle-side hitch component, around one of the insertion connector rotation axes.

For the reasons recited previously, it is preferred if at least one of the insertion connector rotation axes, preferably both insertion connector rotation axes, is arranged, when the hitching connection is established, at a distance from the longitudinal center axis of the towing vehicle-side hitch member, preferably at a distance in the longitudinal towing-vehicle direction, particularly preferably in an approach direction in which the towing vehicle-side hitch component can approach the towed vehicle-side hitch component in order to establish a hitched connection. Most highly preferably, for the reasons already recited above, the at least one insertion connector rotation axis is provided at a distance from the longitudinal center axis of the towing vehicle-side hitch member only in a longitudinal towing-vehicle direction, i.e. only in the aforesaid approach direction. Particularly preferably, the towing vehicle-side insertion connector component is in its connection readiness position directly above the towing vehicle-side alignment configuration in order to achieve an optimum insertion connection-preparing alignment of the participating insertion connector components. The positional relationships described in this paragraph also apply, in particular, when an insertion connection is established, although it is not to be excluded that the location of at least one insertion connector rotation axis changes, relative to the towed vehicle-side hitch component, when the insertion connection is established.

In the interest of a maximally stable arrangement of the towed vehicle-side insertion connector component and/or of the towed vehicle-side alignment component on the towed vehicle-side hitch component, the aforementioned first alternative for relative movability, i.e. a modifiable distance between the two insertion connector rotation axes as a result of the translational movability of the towed vehicle-side insertion connector component, is preferred.

In the case of modifiable-distance insertion connector rotation axes, it is preferred if the towed vehicle-side insertion connector component and/or the towed vehicle-side alignment component are arranged rotatably, relative to a support component, around a first of the insertion connector rotation axes, and that the support component be arranged rotatably, relative to the towed vehicle-side hitch component, around the second insertion connector rotation axis parallel to the first. The support component can then be arranged rotatably in stable fashion on the towed vehicle-side hitch component, in particular on a drawbar, with only one degree of freedom of motion, i.e. with a rotational degree of freedom of motion around the second insertion connector rotation axis.

In addition, the towed vehicle-side insertion connector component and/or the towed vehicle-side alignment component is then preferably translationally displaceable relative to the support component along the trajectory orthogonal to the insertion connector rotation axes. As has already been discussed above with reference to the towing vehicle-side alignment component and its alignment configuration, and to the towing vehicle-side insertion connector component carried by the towing vehicle-side alignment component, the towed vehicle-side insertion connector component and/or the towed vehicle-side alignment component can also, for the reasons already recited, preferably be displaceable relative to the support component along the trajectory against the return force of a return device, and can also be rotatable around the first insertion connector rotation axis. Separate return devices can be provided, one for return around the first insertion connector rotation axis and one for return along the trajectory.

The return device acting along the trajectory can be constructed analogously to the preload device recited earlier, so that a design that has already been used can be utilized repeatedly in the hitching apparatus in order to facilitate maintenance and installation. Provision can be made for this purpose that the return device encompasses two coaxial springs, overlapping one another at least in portions, which define a neutral position of the towed vehicle-side insertion connector component, each of which returns the towed vehicle-side insertion connector component and/or the towed vehicle-side alignment component along the trajectory in a different one of two opposite directions. Provision can therefore also be made that the towed vehicle-side insertion connector component and/or the towed vehicle-side alignment component is guided to move along the trajectory along a plurality of, preferably two, parallel guidance apparatuses, in particular guidance rods, arranged at a distance from one another, one return device preferably being provided on each guidance apparatus.

While the towing vehicle-side insertion connector component and the towing vehicle-side alignment component carrying it are as a rule relatively well shielded from road influences by the towing vehicle itself—since usually the towing vehicle-side hitch component is installed on the vehicle crossmember located closest to the rear of the vehicle in a longitudinal vehicle direction, so that as a rule a vehicle superstructure projects beyond the towing vehicle-side hitch component and, with it, the alignment component and the insertion connector component—the towed vehicle-side alignment component along with the towed vehicle-side insertion connector component carried by it is usually arranged on a drawbar enclosed by the towed vehicle-side hitch component and is thus uncovered. It is therefore highly exposed to external influences.

According to a preferred refinement of the present invention provision is therefore made that at least one component from among the towed vehicle-side alignment component and towed vehicle-side insertion connector component can be received at least in portions in a segment of the towed vehicle-side hitch component when the respective received component is not required, for example because the towed vehicle is parked in a parking area.

Preferably both of the aforesaid components (towed vehicle-side alignment component and insertion connector component) are conveyable, relative to the towed vehicle-side hitch component, into a position in which they are less exposed when not in use than in a position in which they are ready for establishment of an insertion connection.

According to a preferred refinement of the present invention provision is therefore made that a towed-side assembly that encompasses the towed vehicle-side alignment component and the towed vehicle-side insertion connector component is arranged on a drawbar of the towed vehicle, displaceably relative to a towed vehicle-side hitch member, for example a hitching eye, of the towed vehicle-side hitch component, between an inactive position in which at least a segment of the towed-side assembly is surrounded by a wall segment of the drawbar, and an active position, different from the inactive position, in which the towed vehicle-side insertion connector component is surrounded by a wall segment of the drawbar to a lesser extent than in the inactive position. The towed-side assembly can thus be retracted in the inactive position as compared with the active position, so that when the towed-side assembly is in the inactivated position at least the towed vehicle-side insertion connector component is retracted as compared with the active position, preferably is retracted away from the towed vehicle-side hitch member in a longitudinal drawbar direction. Because at least one segment of the towed-side assembly is surrounded by a wall segment of the drawbar, the towed-side assembly, and with it the towed vehicle-side insertion connector component and the towed vehicle-side alignment component, are more protected from external influence, in particular mechanical influence, in the inactive position than in the active position.

Preferably at least one segment of the drawbar is embodied to be hollow. As a result, not only can the mass of the towed vehicle which needs to be accelerated be reduced, but it is thereby also possible to constitute on the drawbar a receiving space into which at least a segment of the towed-side assembly can be conveyed upon displacement into the inactive position. Even better protection of the towed-side assembly from external influences is therefore possible when the towed-side assembly in the inactive position is received, at least in portions, in a cavity that is constituted by the drawbar wall and is completely surrounded, with the exception of any retaining orifices and the like, around a longitudinal drawbar axis.

Even when a hitched connection is established, preferably the towed vehicle-side insertion connector component is not accessible to the towed vehicle-side insertion connector component for establishment of the insertion connection when the towed-side assembly is in the inactive position. With a hitched connection established, this is preferably the case only when the towed-side assembly is in the active position. It is thereby possible to prevent an insertion connection from being established unless the towed vehicle-side insertion connector component is in a position suitable therefor.

In order to ensure displacement of the towed-side assembly between the inactive position and active position repeatably with sufficient operating reliability, provision can further be made that the towed-side assembly is guided, for motion between the inactive position and the active position, on a guidance configuration provided on the drawbar.

According to a preferred refinement of the present invention, shielding of the towed vehicle-side insertion connector component and/or of the towed vehicle-side alignment component from external influences when the towed-side assembly is in the inactive position can be further increased by the fact that the motion of the towed-side assembly between an active position and inactive position comprises not only a retraction motion component in the longitudinal drawbar direction, but also a recessing motion component in a vertical drawbar direction orthogonal both to the transverse drawbar direction and to the longitudinal drawbar direction.

In order to assist the motion, necessary in the case of entry into service of the towed vehicle, of the towed-side assembly into the active position, provision can be made that the towed-side assembly is preloaded into the active position by a loading device that preferably encompasses at least one spring. This loading device can be any loading device that is capable of exerting force on the towed-side assembly toward the active position. The loading device therefore preferably encompasses a spring that is operationally ready independently of any external energy supply.

In principle, it is not to be excluded that the towed-side assembly can be moved between its active position and its inactive position by a motion drive system, for example a piston-cylinder arrangement that can be operated pneumatically or hydraulically, or by an electric-motor drive system. This drive system can advantageously be received in a cavity constituted by the drawbar itself.

Weight- and cost-saving manual actuation of the towed-side assembly for motion between the inactive position and active position, which is assisted by preloading into the active position is, however, preferred.

The towed-side assembly can therefore very generally interact with a shifting device by which the towed-side assembly is displaceable between the active position and the inactive position. This can be the aforesaid manual displacement capability, or can be the displacement capability via mechanical actuators which is likewise recited. The manual drive capability can comprise a force-transferring linkage or transmission, in particular in order to overcome the preload force of the springs upon displacement into the inactive position.

Whereas a shifting device that mechanically drives the towed-side assembly can be received in its entirety, with the exception of its energy supply and possible a control signal lead, in a cavity of the drawbar, at least one segment of a shifting device embodied for manual displacement of the towed-side assembly passes through the drawbar so that it is reliably accessible from outside for manual engagement. In ergonomically advantageous fashion, the at least one segment of the shifting device passes through the drawbar in a transverse drawbar direction.

In order to facilitate collective movability of the towed-side assembly between an inactive position and active position, the towed-side assembly can be installed on a base plate and can be displaceable together therewith between the active position and inactive position. For example, the aforementioned support component can be installed directly on the aforesaid base plate, for example rotatably around the aforementioned insertion connector rotation axis.

In the active position, the base plate can close off the drawbar cavity in which the towed-side assembly is received at least in portions in its inactive position. There can be provided for this purpose, on a segment of the drawbar and/or on the base plate, a seal arrangement that, at least when the towed-side assembly is in the active position, seals the base plate against at least one segment of a drawbar wall enclosing a cavity.

The present invention and its advantageous refinements will be explained below in further detail with reference to the appended drawings, in which:

FIGS. 1 to 4 depict a hitching apparatus according to the present invention, labeled generally as 10, from different perspectives and with the participating hitch components in different positions relative to one another.

Figure 1:
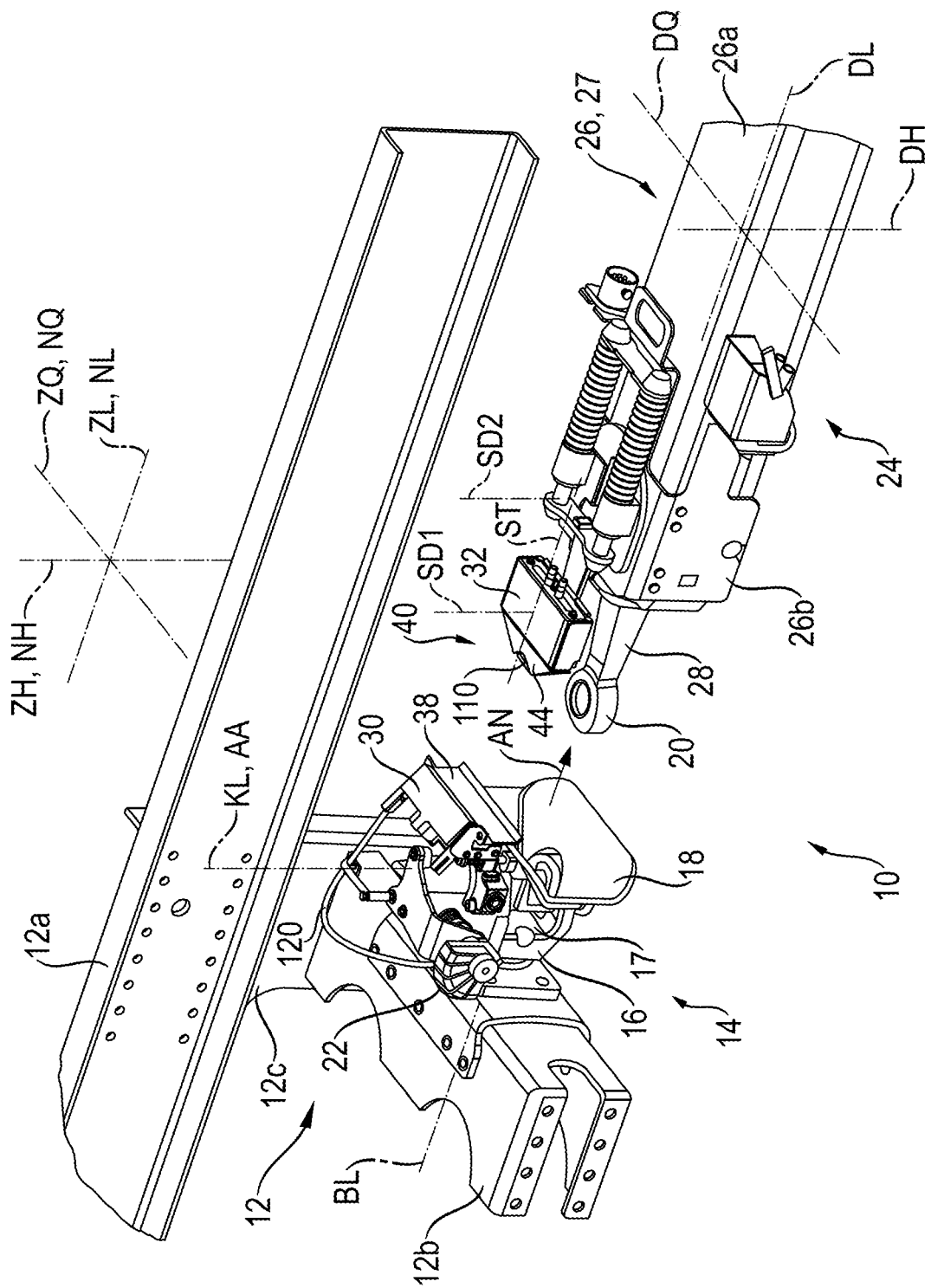
FIG. 1 is a perspective view of a hitching apparatus according to the present invention, the hitched connection not having been established.

FIG. 1 depicts a vehicle frame 12 of a towing vehicle. It encompasses a longitudinal member 12a extending along a longitudinal towing-vehicle axis ZL, and a towing vehicle crossmember 12b extending orthogonally thereto in transverse towing-vehicle direction ZQ.

Longitudinal towing-vehicle axis ZL and transverse towing-vehicle axis ZQ extend parallel to a supporting substrate of the towing vehicle. A vertical towing-vehicle axis ZH, orthogonal to both of the aforesaid axes, therefore extends orthogonally to supporting substrate U that is indicated merely schematically in FIGS. 2 and 3. Longitudinal towing-vehicle axis ZL is parallel to the roll axis of the towing vehicle, transverse towing-vehicle axis ZQ is parallel to the pitch axis of the towing vehicle, and vertical towing-vehicle axis ZH is parallel to the yaw axis of the towing vehicle. In the present Application, the term "yaw axis" is always used synonymously with a vertical vehicle axis, the term "pitch axis" synonymously with a transverse vehicle axis, and the term "roll axis" synonymously with a longitudinal vehicle axis.

Crossmember 12b either can be connected directly to longitudinal member 12a or, as depicted in the Figures, can be connected via a vertical panel 12c to longitudinal member 12a.

Towing vehicle-side hitch component 14 of a bolt hitch depicted in FIGS. 1 to 4 is mounted on towing vehicle crossmember 12b at the transverse center thereof.

Towing vehicle-side hitch component 14 encompasses a hitch housing 16 on which a hitch bolt (not depicted in FIG. 1), constituting a hitch member, is received movably in known fashion along yaw axis ZH of the towing vehicle. Longitudinal center line KL, parallel to the yaw axis, of the hitch bolt is depicted in FIGS. 1 to 4.

Figure 2:
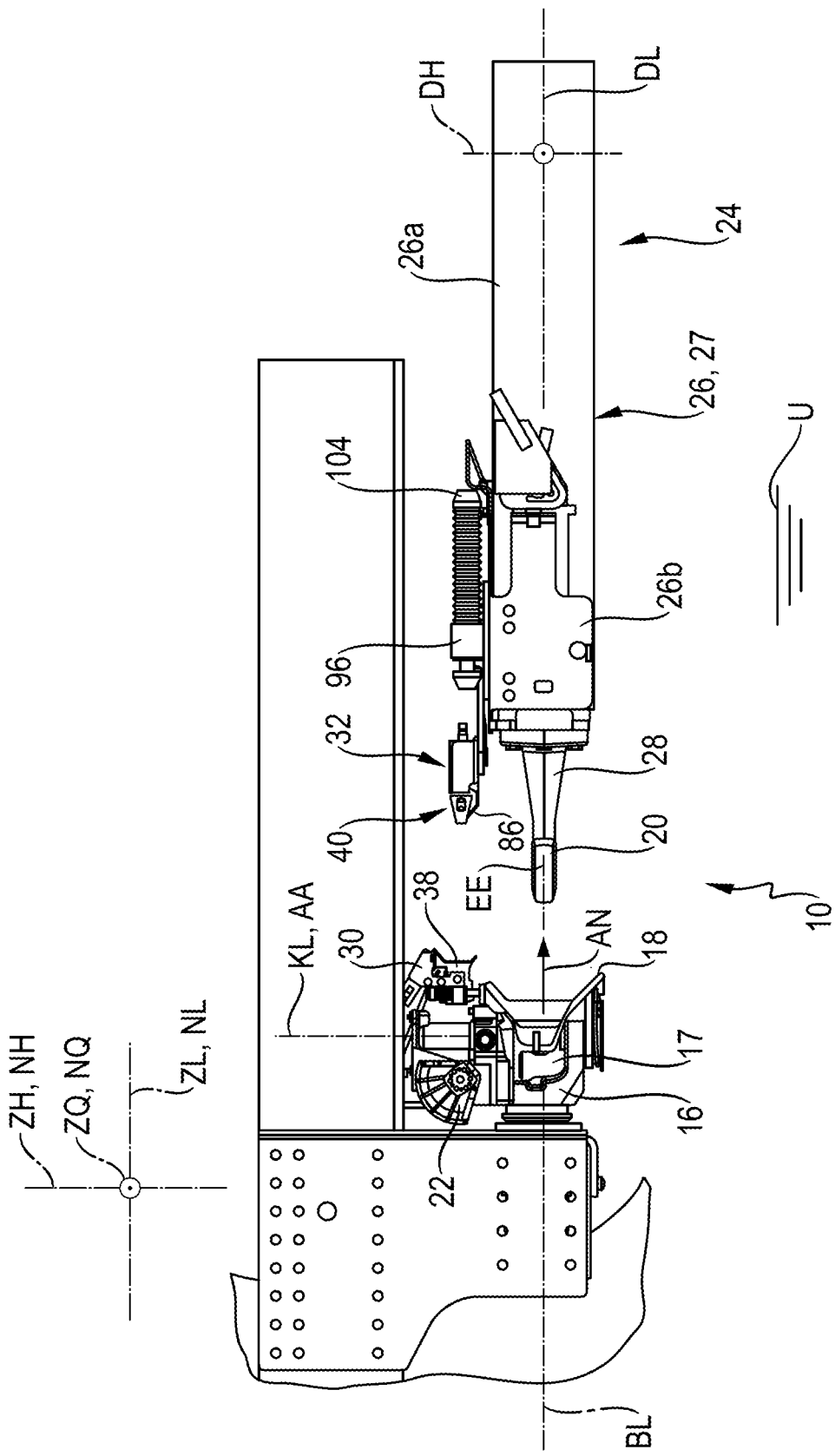
FIG. 2 shows the hitched connection of FIG. 1, viewed in the direction of the pitch axis of the participating vehicles.
Figure 3:
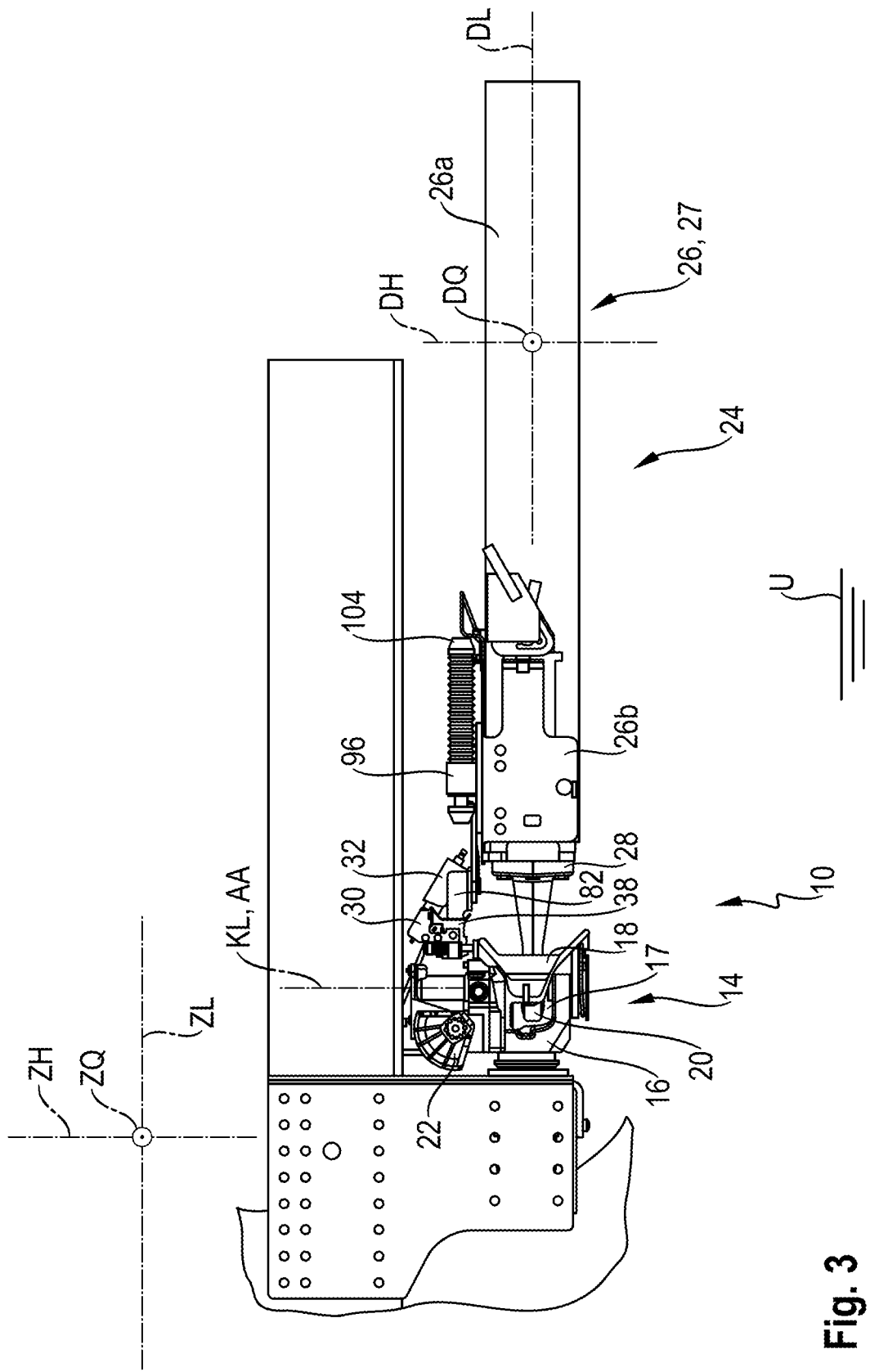
FIG. 3 shows the hitching apparatus of FIG. 2 in the same view, the hitched connection having been established.

Arranged on hitch housing 16, whose towing eye receiving space 17 is penetrated to different degrees by the hitch bolt depending on its operating position, is a coupling jaw 18, pivotable around longitudinal center axis KL of the hitch bolt, which is preloaded into the position depicted in FIGS. 1 to 3. Coupling jaw 18 facilitates, in a manner known per se, the insertion of a towed vehicle-side towing eye 20, which represents a towed vehicle-side hitch member, into towing eye receiving space 17 for engagement by the hitch bolt.

In the example depicted, towing vehicle-side hitch component 14 has a Kinetrol actuator 22 that, inter alia, serves as a source of driving force for a motion of the hitch bolt at least into the position retracted out of towing eye receiving space 17 of hitch housing 16. In that position, towing eye receiving space 17 of hitch housing 16 is free for towing eye 20 to be respectively introduced into and pulled out of towing eye receiving space 17.

In the reference position shown in FIGS. 1 and 2, in which the towing vehicle and towed vehicle, represented by the towed vehicle-side hitch component 24, are arranged on one common flat substrate directly behind one another with coplanar longitudinal vehicle center planes orthogonal to the common substrate U, the towing vehicle, represented by its vehicle frame 12, can be caused to approach towing eye 20 of the towed vehicle along longitudinal towing-vehicle axis ZL in an approach direction AN pointing toward the towed vehicle, in order to introduce towing eye 20 into towing eye receiving space 17 of hitch housing 16 so as to establish a hitched connection engagement with the hitch bolt, and thus to establish a hitched connection between the towed and towing vehicles.

Towed vehicle-side hitch component 24 comprises a drawbar 26 having a drawbar body 27. Drawbar body 27 comprises a first drawbar-body component 26a located closer to a towed-vehicle body (not depicted), and a second drawbar-body component 26b located closer to towing eye 20. A towing-eye component 28 is connected fixedly to drawbar body 27 at that longitudinal end of second drawbar-body component 26b which is located closer to towing eye 20.

In FIGS. 1 to 3, drawbar body 27, and with it the entire towed vehicle, extends with a longitudinal towed-vehicle axis NL that is parallel to the longitudinal towing-vehicle axis ZL. Transverse towed-vehicle axis NQ is likewise parallel to transverse towing-vehicle axis ZQ. Lastly, vertical towed-vehicle axis NH is also parallel to vertical towing-vehicle axis ZH. This further characterizes the aforementioned reference state in which the towing vehicle and towed vehicle are located in FIGS. 1 to 3. In the reference state, a longitudinal drawbar-body axis DL passing centrally through drawbar body 27 is collinear with a longitudinal axis BL, parallel to longitudinal towing-vehicle axis ZL, through towing eye receiving space 17 in hitch housing 16 of towing vehicle-side hitch component 14. When a hitched connection has been established and when the hitch bolt passes through towing eye 20 and through towing eye receiving space 17 of hitch housing 16, the aforesaid longitudinal axis BL also passes through the hitch bolt. Longitudinal drawbar-body axis DL also passes through towing eye 20 diametrically in its equatorial plane EE which, in the reference state depicted, is oriented parallel to substrate U. In FIG. 2, equatorial plane EE of towing eye 20 is oriented orthogonally to the drawing plane of FIG. 2.

For the sake of completeness, be it noted that when longitudinal drawbar-body axis DL is aligned parallel to the substrate, a vertical drawbar-body axis DH passes through drawbar 26 and drawbar body 27 parallel to vertical axes ZH and NH of the towing vehicle and towed vehicle. Transverse drawbar-body axis DQ is then also orthogonal to vertical drawbar-body axis DH and to longitudinal drawbar axis DL.

When the hitched connection is established as shown in FIG. 3, and thus when the vehicle combination is established, when a relative pitching motion occurs between the towing and towed vehicles, for example because a correspondingly curved substrate is being traversed, longitudinal drawbar-body axis DL is rotated relative to longitudinal towing-vehicle axis ZL by an amount equal to the pitch angle. The same applies to vertical drawbar-body axis DH orthogonal to longitudinal drawbar-body axis DL.

Figure 4:
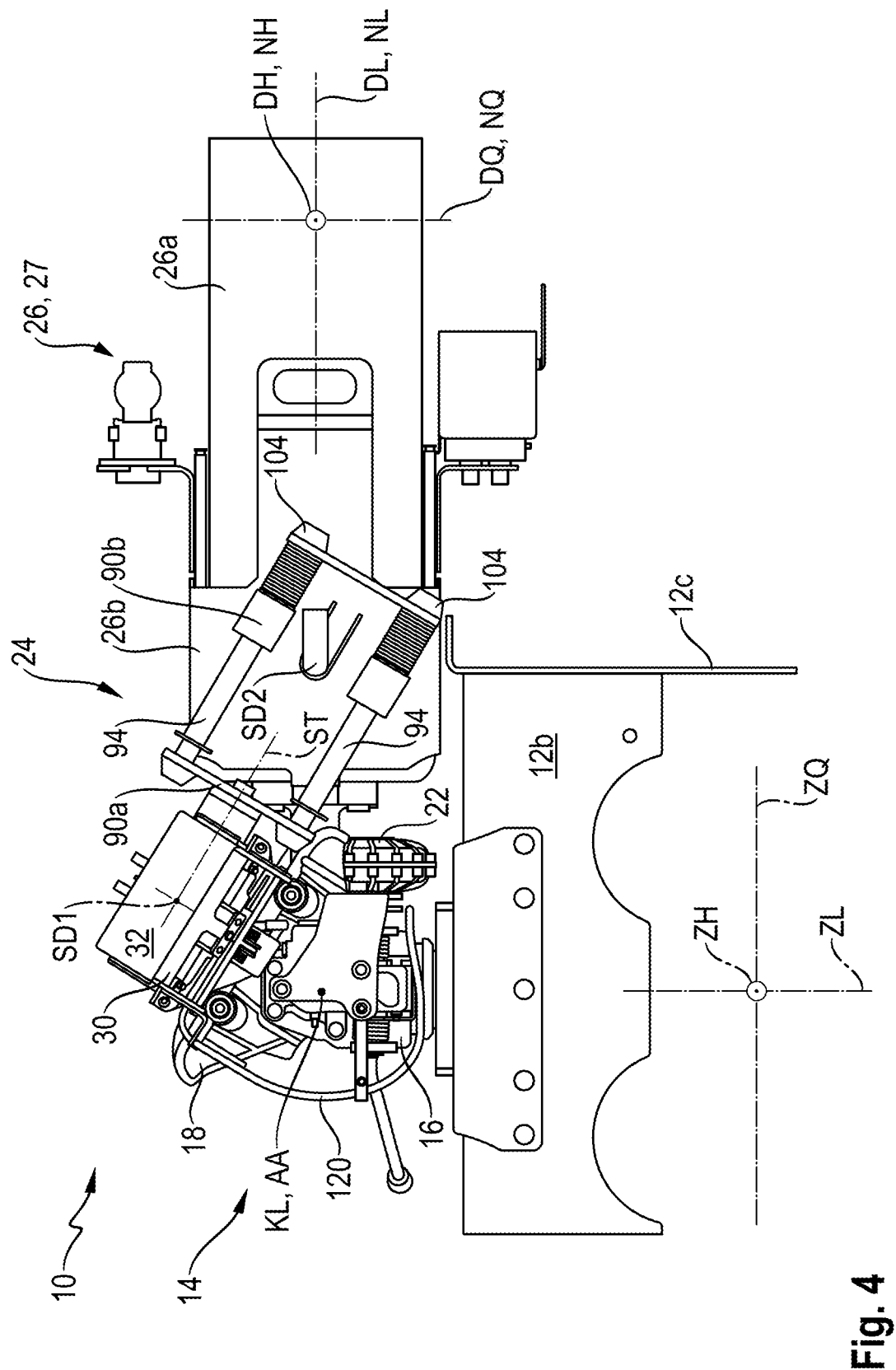
FIG. 4 is a plan view of the hitched connection of FIG. 3 at the maximum possible angle between the towing vehicle-side and towed vehicle-side hitch components relative to one another.

When the constituted vehicle combination turns, as shown in an extreme case in FIG. 4, longitudinal drawbar-body axis DL is bent relative to longitudinal towing-vehicle axis ZL around a turning axis AA, constituted by longitudinal hitch axis KL, of the vehicle combination. A corresponding situation exists for transverse drawbar-body axis DQ orthogonal to longitudinal drawbar-body axis DL. The body axes parallel to the respective bending or turning axes—i.e. transverse axes ZQ and DQ in the context of pitching, and vertical axes ZH and DH in the context of turning—remain respectively parallel to one another. Drawbar 26 is assumed in the present case to be immovable relative to the remainder of the towed vehicle, although that need not be the case. Longitudinal drawbar-body axis DL is therefore parallel to longitudinal towed-vehicle axis NL, transverse drawbar-body axis DQ is parallel to transverse towed-vehicle axis NQ, and vertical drawbar-body axis DH is parallel to vertical towed-vehicle axis NH.

Hitch components 14 and 24 are not only embodied to establish the hitched connection that ensures the transferability, necessary for constituting a vehicle combination, of towing force from the towing vehicle to the towed vehicle, but are furthermore embodied, extremely advantageously, for automated establishment of an energy- and/or information-transferring insertion connection between a towing vehicle-side insertion connector component 30 and a towed vehicle-side insertion connector component 32. Corresponding energy- and/or information-transferring supply lines, for which insertion connector components 30 and 32 constitute an interface on the respective vehicle from among the towing vehicle and towed vehicle, are not depicted in Figures in the interest of clarity.

Figure 7:
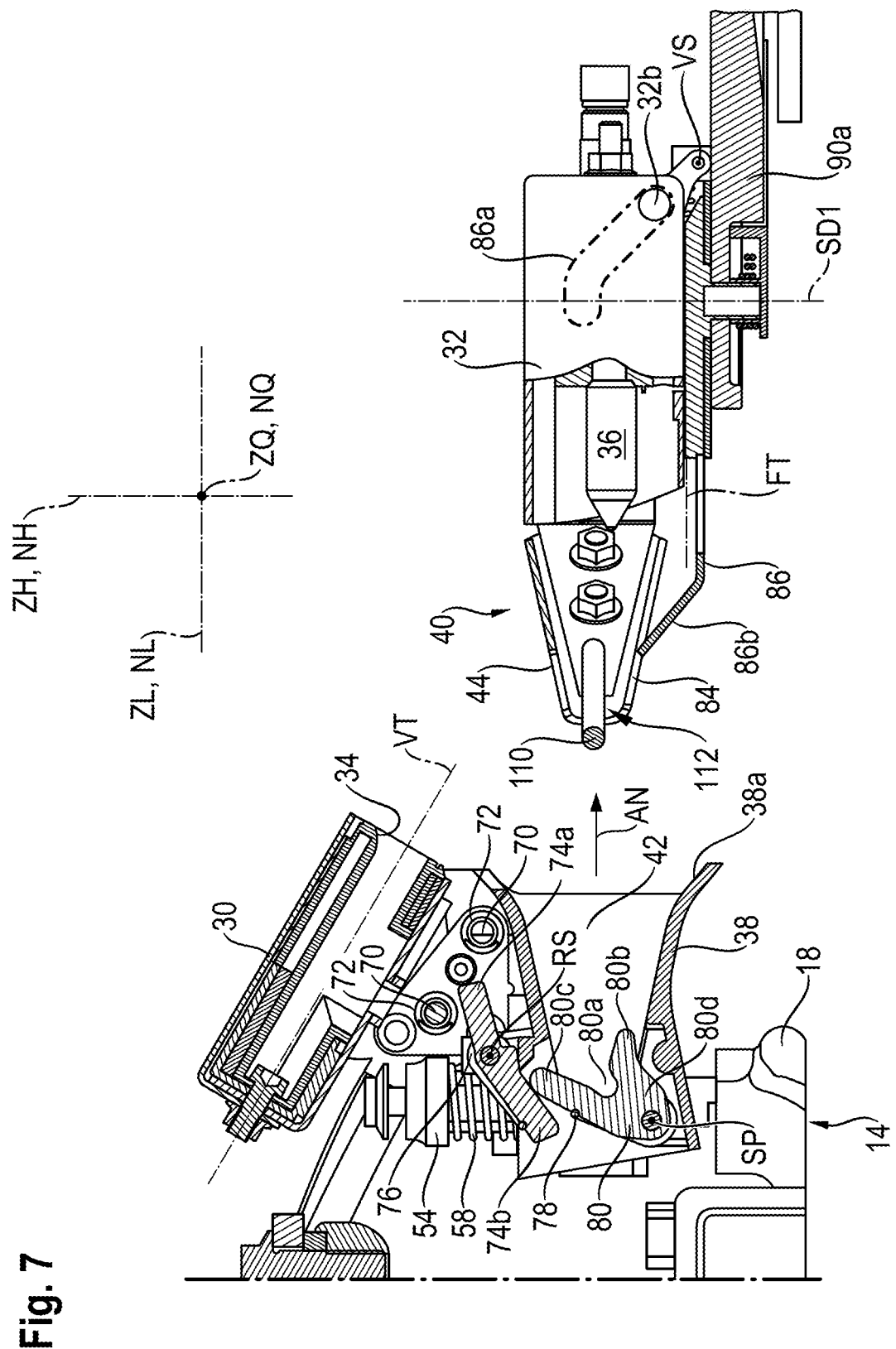
FIG. 7 is a sectioned depiction of the towing vehicle-side alignment and insertion connector components and of the towed vehicle-side alignment and insertion connector components in accordance respectively with FIGS. 5 and 6, prior to establishment of a positive engagement between the alignment components.
Figure 8:
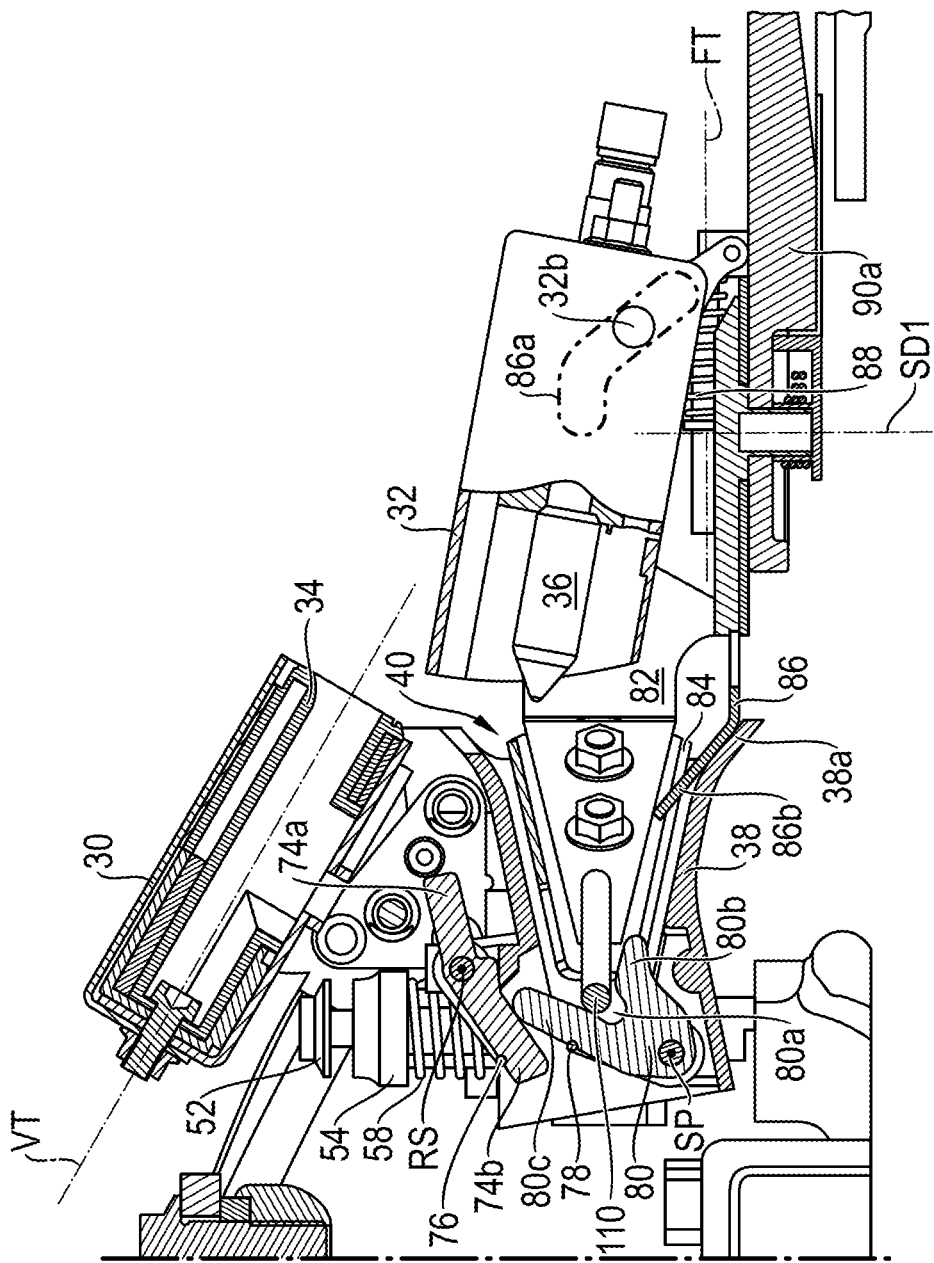
FIG. 8 shows the components of FIG. 7 as the towing vehicle-side and towed vehicle-side alignment components approach one another.
Figure 9:
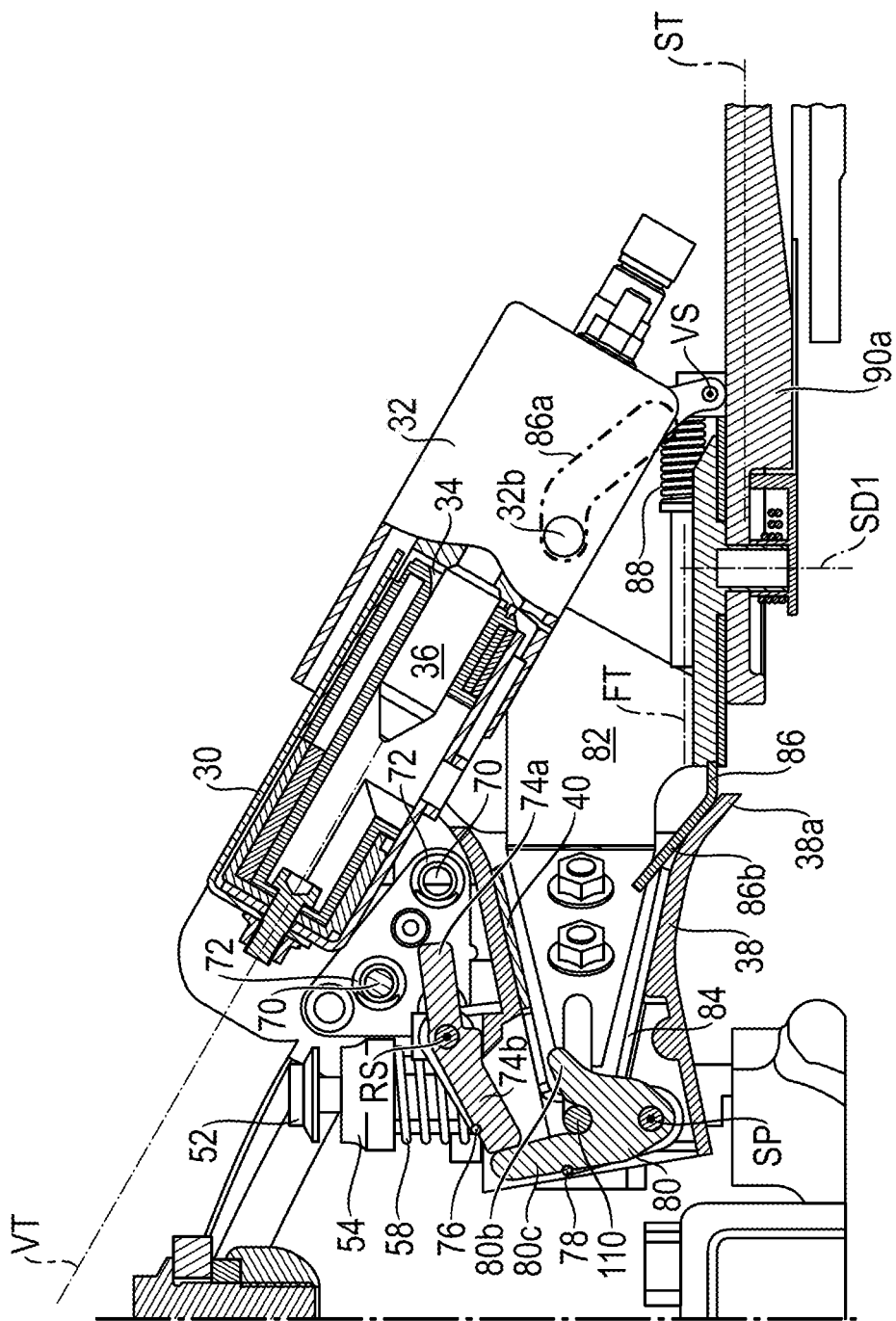
FIG. 9 shows the components of FIGS. 7 and 8 with the towing vehicle-side and towed vehicle-side alignment components fastened to one another in positive engagement, and with the towing vehicle-side and towed vehicle-side insertion connector components in an established insertion connection.

The actual transfer of energy and/or information via insertion connector components 30 and 32 that are connected when an insertion connection is established occurs via towing vehicle-side insertion connector configuration 34 and towed vehicle-side insertion connector configuration 36, both of which are depicted schematically in FIGS. 7 to 9. Insertion connector configurations 34 and 36 of the towing vehicle and towed vehicle contact one another when an insertion connection is established, and thus constitute a capability for transferring energy in electrical and/or pneumatic and/or hydraulic form, and/or information, between the towing vehicle and towed vehicle.

An insertion connector configuration, for example towing vehicle-side insertion connector configuration 34 in the example depicted, can be embodied as a socket.

The respective other insertion connector configuration, here towed vehicle-side insertion connector configuration 36, can be embodied as a male insertion connector.

In order to facilitate establishment of the insertion connection, towing vehicle-side hitch component 14 comprises a towing vehicle-side alignment component 38, and towed vehicle-side hitch component 24 comprises a towed vehicle-side alignment component 40. In order to establish a positive engagement with one another, alignment components 38 and 40 are embodied so as to convey insertion connector components 32 and 34 into an initial situation that is advantageous for establishment of an insertion connection, i.e. to align them in insertion connection-preparing fashion.

One of the alignment components—in the present example, towing vehicle-side alignment component 38—advantageously comprises an alignment recess 42 as an alignment configuration. The respective other alignment component—in this case, towed vehicle-side alignment component 40—comprises as an alignment configuration a projection 44 tapering toward the respective other vehicle of the vehicle combination.

In order for the insertion connection-preparing alignment to function with a short alignment motion path, at least one alignment component carries the insertion connector component of the same vehicle in such a way that the insertion connector component is movable relative to the alignment component carrying it. In the present example, towing vehicle-side insertion connector component 30 is movable relative to towing vehicle-side alignment component 38, and towed vehicle-side insertion connector component 32 is also movable with respect to towed vehicle-side alignment component 40.

Towing vehicle-side alignment component 38 is in turn preferably arranged on coupling jaw 18 of towing vehicle-side hitch component 14 so that its relative movability relative to the hitch bolt and to hitch body 16 can also be used for insertion connector component 32 provided on towing vehicle-side alignment component 38.

It is evident from FIGS. 2 and 3 that towing vehicle-side alignment component 38 with its insertion connector component 30 is arranged with an offset along longitudinal towing-vehicle axis ZL, and preferably in approach direction AN of the towing vehicle toward the towed vehicle in the context of establishment of the hitched connection. It is thereby possible to achieve an arrangement which is very compact along the vertical towing-vehicle axis but in which towing vehicle-side alignment component 38 and the associated insertion connector component 30 can nevertheless be arranged above longitudinal axis BL passing through towing vehicle-side hitch component 14.

With functionally comparable solutions in the existing art, the towing vehicle-side alignment component and/or the towing vehicle-side insertion connector component are arranged in alignment with longitudinal center line KL of the hitch bolt. With the advantageous arrangement, according to the present invention, of towing vehicle-side alignment component 38 and insertion connector component 30 offset orthogonally with respect to the notionally prolonged longitudinal center line KL of the hitch bolt, a bolt receptacle 16a of hitch housing 16, in which the hitch bolt is received when it is retracted out of towing eye receiving space 17 of hitch housing 16, can be arranged along vertical towing-vehicle axis ZH axially overlappingly with towing vehicle-side alignment component 38 and/or with towing vehicle-side insertion connector component 30.

Figure 5:
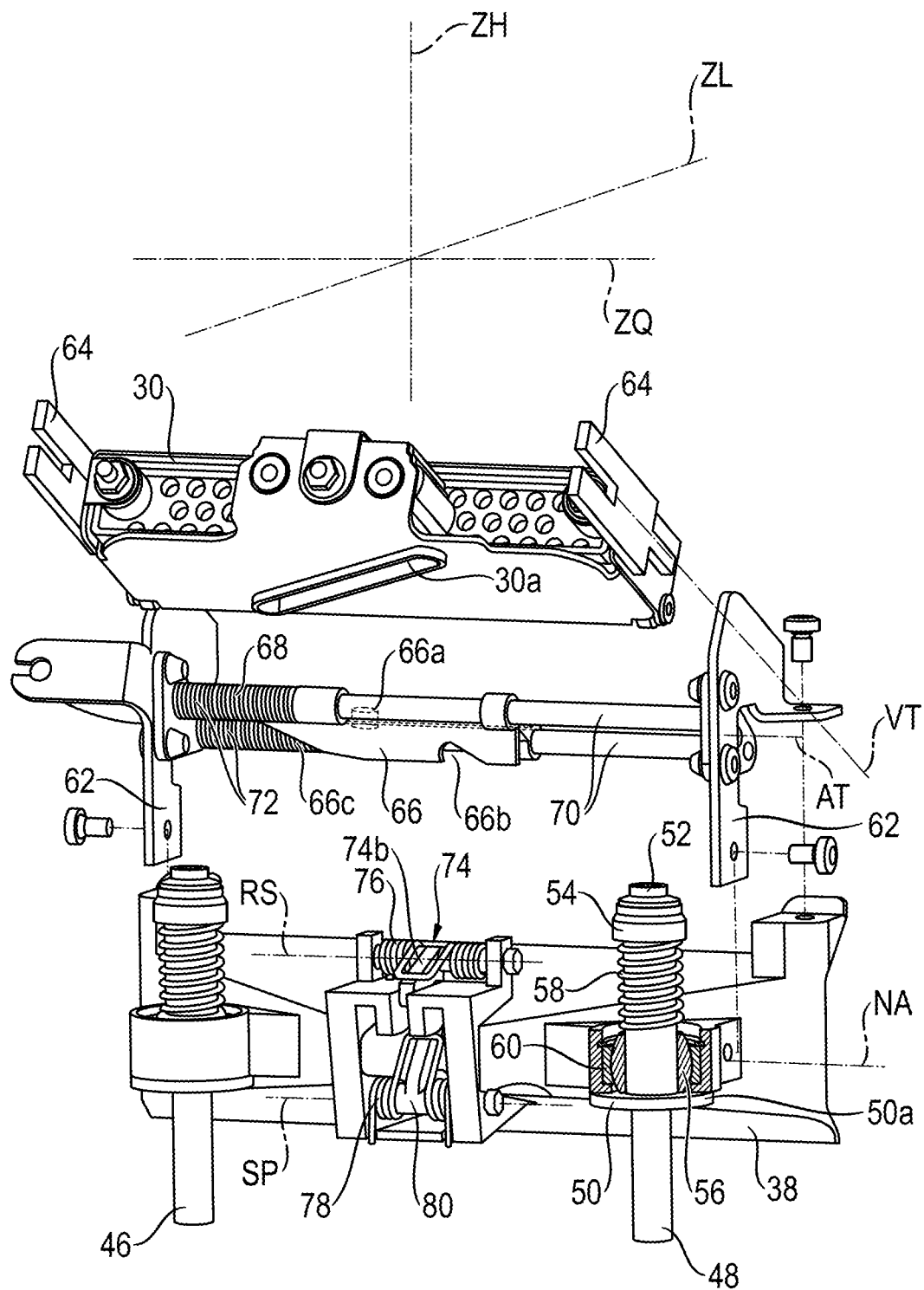
FIG. 5 is a rear view, shown in partly sectioned and partly exploded fashion, of a towing vehicle-side alignment component with the towing vehicle-side insertion connector component, carried thereby, of the hitching apparatus of FIGS. 1 to 4.

Towing vehicle-side alignment component 38, having towing vehicle-side insertion connector component 30 provided movably relative thereto, will be explained below with reference to FIG. 5. Vertical towing-vehicle axis ZH and transverse towing-vehicle axis ZQ are indicated in FIG. 5 for easier orientation. Longitudinal towing-vehicle axis ZL is tilted slightly to the left around the line perpendicular to the drawing plane of FIG. 5. In FIG. 5, towing vehicle-side alignment configuration 42 faces away from the viewer.

Alignment component 38, with its alignment recess 42 complementary at least in portions to alignment projection 44, is translationally movably guided on two parallel guidance rods 46 and 48 extending along vertical towing-vehicle axis ZH.

Guidance of towing vehicle-side alignment component 38 is implemented substantially identically on the two guidance rods 46 and 48. In the interest of clarity, guidance is therefore explained only with reference to guidance rod 48 on the right in FIG. 5.

A guidance cup 50 is guided on guidance rod 48 movably along guidance rod 48 and along vertical towing-vehicle axis ZH, guidance cup 50 being preloaded into its end position, remote from the coupling jaw, by an inner helical compression spring that is present in the interior of cup 50 and is thus not visible in FIG. 5.

Connected fixedly to guidance rod 48 at its longitudinal end remote from the coupling jaw is an end-mounted terminating screw 52 against which a boss 54, connected to guidance cup 50 for motion together, abuts as a result of the preload of the radially inner helical compression spring. Guidance cup 50 can therefore move, from its neutral position shown in FIG. 5, only downward along guidance rod 48, i.e. toward coupling jaw 18. A pivot joint ball 56 is movably guided radially externally on guidance cup 50, said ball being preloaded against a peripheral radially outwardly projecting radial projection 50a of guidance cup by a second, outer helical compression spring 58 that is arranged coaxially and overlappingly with the inner helical spring in the interior of the guidance cup. In the position shown in FIG. 5, pivot joint ball 56 can move relative to guidance cup 50, against the preload force of outer helical compression spring 58 braced between pivot joint ball 56 and boss 54, only upward, away from radial projection 50a, toward boss 54.

Alignment component 38 is thus preloaded on guidance rods 46 and 48 into a neutral position depicted in FIG. 5, out of which alignment component 38 is deflectable in both opposite directions along guidance rods 46 and 48 (along vertical towing-vehicle axis ZH). Each pivot joint ball 56 is guided on alignment component 38 in a sliding shell 60 in the shape of a negative spherical cavity, so that alignment component 38 is not only displaceable along vertical towing-vehicle axis ZH but also pivotable relative to guidance rods 46 and 48 around a pitch alignment axis NA parallel to pitch axis ZQ of the towing vehicle.

The arrangement of two parallel guidance rods 46 and 48 is made for reasons of optimum installation space utilization, so that a latching mechanism, described in more detail below in conjunction with FIGS. 7 to 9, for latching alignment components 38 and 40 to one another can be received between guidance rods 46 and 48.

In the present example, a carrying component 62, which protrudes from alignment component 38 (in the example depicted, away from coupling jaw 18 in the direction of towing-vehicle yaw axis ZH), is retained with screws on alignment component 38. Additionally or alternatively, the connection between carrying component 62 and alignment component 38 can also be established using connecting means other than screws.

Towing vehicle-side insertion connector component 30 is movable on carrying component 62 along a connecting trajectory VT between two different positions, namely between a retracted connection readiness position located closer to the notionally prolonged longitudinal center axes of guidance rods 46 and 48, and a connection activation position offset toward the towed vehicle along connecting trajectory VT. Guidance means 64 can be provided for this purpose on insertion connector component 30 and/or on carrying component 62 (guidance means 64 are depicted in FIG. 5 only on towing vehicle-side insertion connector component 30).

Towing vehicle-side insertion connector component 30 is usually arranged on towing vehicle-side hitch component 14 in such a way that connecting trajectory VT passing through insertion connector component 30 at its transverse center, along with a longitudinal center line BL that passes centrally through the towing eye receiving space or through the hitch bolt in its position passing through a towing eye, are located in a longitudinal vehicle center axis, placed orthogonally to supporting substrate U of the towing vehicle, of the towing vehicle, and enclose an angle between one another. The intersection point between the notionally prolonged connecting trajectory VT and longitudinal center line BL that passes through the hitch bolt is preferably offset proceeding from the hitch bolt toward the towed vehicle, which makes possible the advantageous arrangement of towing vehicle-side insertion connector component 30 above coupling jaw 18 along vertical towing-vehicle axis ZH.

A drive component 66 and a force device 68 are provided on carrying component 62 (which is preferably embodied in multiple parts) as a motion drive system for displacing towing vehicle-side insertion connector component 30 between the aforesaid positions (connection readiness position and connection activation position). Provided for this purpose, more precisely, are two parallel guidance rails in the form of guidance rods 70 that span carrying part 62 along transverse towing-vehicle axis ZQ, on which drive component 66 is received in guided fashion, movably along a drive trajectory AT parallel to transverse towing-vehicle axis ZQ. Force device 68 preferably encompasses helical compression springs 72, preferably one on each drive system guidance rod 70. Helical compression springs 72, which do not require an external energy supply, are arranged between one transverse end along transverse towing-vehicle axis ZQ and that end of drive component 66 which is located closer to that end.

Drive component 66 can be coupled to towing vehicle-side insertion connector component 30 via a mechanical control system so that a projection 66a, which engages into a gate 30a on insertion connector component 30, can be provided e.g. on drive component 66 protrudingly therefrom. Drive component 66 is shown in FIG. 5 in its initial position constituting one of its possible end positions, in which helical compression springs 72 exhibit their greatest quantity of potential energy. When drive component 66 is in this initial position, towing vehicle-side insertion connector component 30 is in its connection readiness position as a result of the positive engagement of cam 66a and gate 30a.

A latching bar 74, having two arms in the example depicted, engages with its latching limb 74a (not visible in FIG. 5; see FIGS. 7 to 9) into a latching recess 66b on drive component 66 and thereby secures the latter against displacement into the end position (not depicted) that is offset along the drive trajectory to the right in FIG. 5.

Latching bar 74 is preloaded, by a spring 76 that engages onto actuation limb 74b of latching bar 74, into its latched position in which its latching limb 74a unassistedly engages into latching recess 66b as soon as the latter is located above latching limb 74a.

A further spring 78, on that side of alignment component 38 which faces away from alignment recess 42, preloads a locking hook 80 (which will be discussed in further detail below) into its introduced position in which it is visible in FIG. 7. Latching bar 74 is pivotable around a latching-bar pivot axis RS extending parallel to transverse towing-vehicle axis ZQ, just as locking hook 80 is pivotable around a locking-hook pivot axis SP parallel to transverse towing-vehicle direction ZQ.

The physical construction of the (in this example) towed vehicle-side alignment component 40, with towed vehicle-side insertion connector component 32 carried thereby, will be described below with reference to FIG. 6, also considering FIGS. 4 and 7.

Towed vehicle-side insertion connector component 32 is received on a receiving component 82 pivotably around a stowage pivot axis VS. In the position (free of external forces) shown in FIG. 6, stowage pivot axis VS is parallel to transverse towed-vehicle axis NQ. It remains parallel to the substrate on which the towed vehicle is standing, regardless of possible relative motions of insertion connector component 32 and of receiving component 82 relative to drawbar 26.

Figure 6:
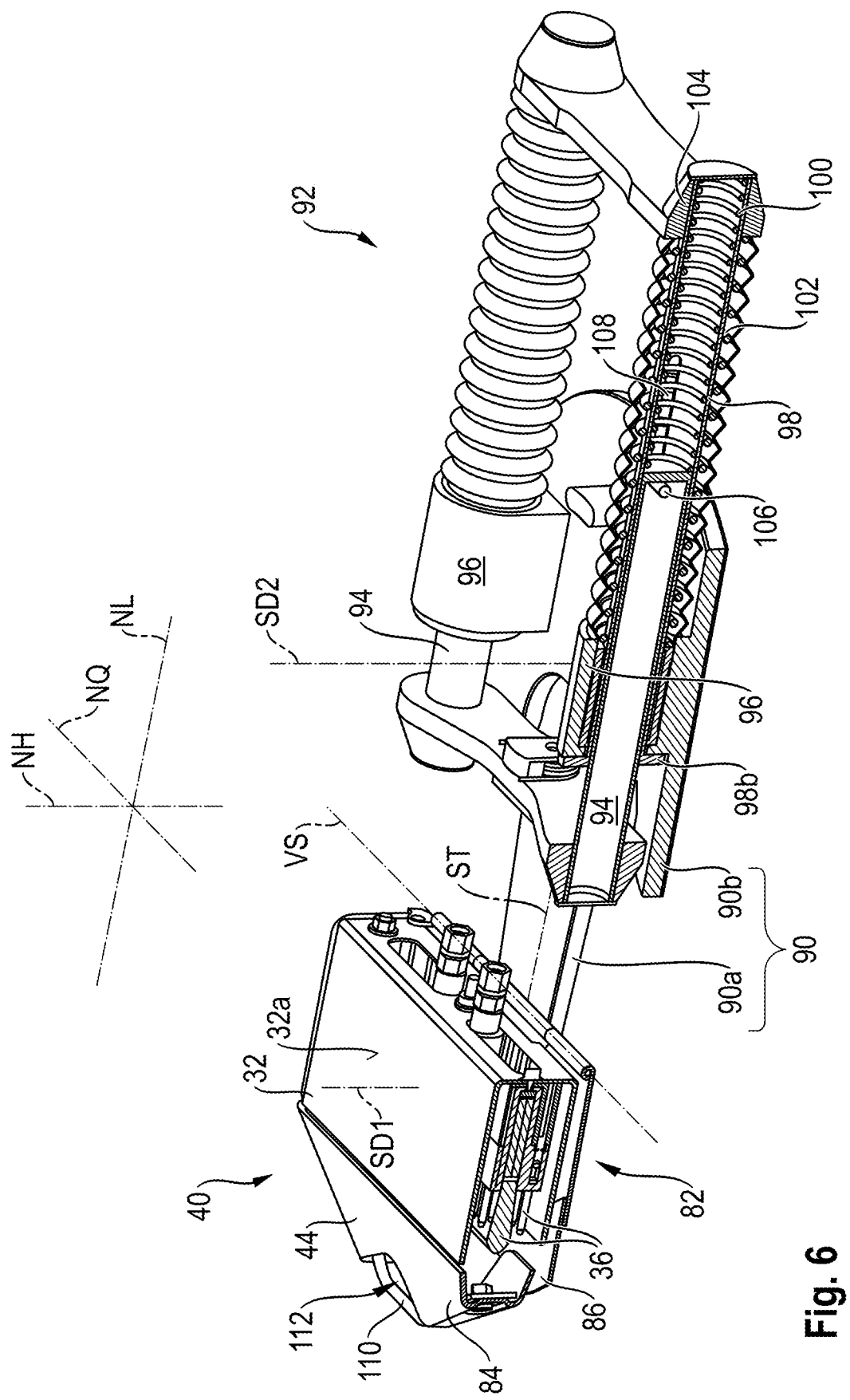
FIG. 6 is a partly sectioned perspective depiction of the towed vehicle-side alignment component with the towed vehicle-side insertion connector component carried thereby.

Insertion connector component 32 is pivotable around stowage pivot axis VS between a stowage position shown in FIG. 6, in which insertion connector configuration 36 of the towed vehicle-side insertion connector component is concealed behind a covering component 84 comprising towed vehicle-side alignment configuration 44 and is not accessible for establishment of an insertion connection, and a connection awaiting position, shown in FIG. 9, pivoted away from the substrate. Receiving component 82 is in the form of a partial housing that surrounds insertion connector component 32 on at least three sides, namely on the bottom and on both sides. A wall 32a of the insertion connector component, which in the stowage position faces away from the supporting substrate of the towed vehicle, combines with covering component 84 to complete receiving component 82 and yield a housing that is compact aside from fitting gaps at the component boundaries.

In the example depicted, a guidance component 86 is arranged along vertical towed-vehicle axis NH between towed vehicle-side insertion connector component 32 and receiving component 82, and is guided movably on receiving component 82 for motion exclusively along a guidance trajectory FT parallel to longitudinal towed-vehicle axis NL. Guidance component 86 can be coupled via a mechanical control system to towed vehicle-side insertion connector component 32 for the transfer of motion and force, for example by the fact that guidance component 86 comprises a guidance gate 86*a* (see FIGS. 7 to 9) into which a cam 32*b*, protruding from insertion connector component 32 along transverse towed-vehicle axis NQ, engages. It is thereby possible, by a displacement of guidance component 86 along longitudinal towed-vehicle axis NL, to shift towed vehicle-side insertion connector component 32 between its stowage position of FIGS. 6 and 7 and the connection awaiting position of FIG. 9. The guidance component can be preloaded by a helical compression spring 88 into its starting position shown in FIG. 7, with the result that because of the mechanical coupling discussed above, insertion connector component 32 is preloaded indirectly into the stowage position.

In FIG. 9, conversely, guidance component 86 is in its final position in which towed vehicle-side insertion connector component 32 is in the connection awaiting position.

Receiving component 82, together with covering component 84, towed vehicle-side insertion connector component 32, and guidance component 36, is received on a support component 90 that is advantageously embodied in two parts in the example depicted and comprises a first segment 90*a* that is provided on a second segment in translationally movably guided fashion relative thereto.

Towed vehicle-side insertion connector component 32 is rotatable relative to support component 90, in particular relative to its first segment 90*a*, around a first insertion connector rotation axis SD1 parallel to towed-vehicle yaw axis NH. This relative movability is at the same time a relative movability of towed vehicle-side insertion connector component 32 relative to drawbar 26.

Support component 90, in particular its second segment 90*b*, is rotatable relative to drawbar 26 that receives it around a second insertion connector rotation axis SD2 that is likewise parallel to towed-vehicle yaw axis NH. Towed vehicle-side insertion connector component 32 is thus rotatable relative to drawbar 26 around two insertion connector rotation axes SD1 and SD2 extending parallel to one another and parallel to vertical drawbar-body axis DH.

Towed vehicle-side insertion connector component 32 is furthermore translationally displaceable relative to drawbar 26 along a trajectory ST orthogonal to insertion connector rotation axes SD1 and SD2. In the example depicted, trajectory ST of the translational displaceability of the towed vehicle-side insertion connector component relative to the drawbar co-pivots around second insertion connector rotation axis SD2 along with second segment 90*b* of support component 90.

The translational displaceability of first segment 90*a* of support component 90, and thus of towed vehicle-side insertion connector component 32, relative to second segment 90*b* of support component 90 is implemented by way of a guidance and return device 92 that corresponds, except for the use of a ball joint, to the translational motion guidance of alignment component 38 relative to coupling jaw 18, as depicted and described in FIG. 5.

Two substantially parallel identical guidance rods 94, connected to first segment 90*a* of support component 90 for motion together and extending in the direction of trajectory ST, are guided movably along trajectory ST, each in a bearing segment 96, on second segment 90*b* of support component 90. A cup-shaped extension component 98, having a radial projection 98*b* provided on the longitudinal end facing toward insertion connector component 32*a*, surrounds a longitudinal end segment of each guidance rod 94; each guidance rod 94 and the extension component 98 arranged on it are movable relative to one another along trajectory ST. An inner helical compression spring 100, received in the interior of extension component 98 between the latter's longitudinal end and that longitudinal end of guidance rod 94 which is remote from insertion connector component 32, loads guidance rod 94 and extension component 98 relative to one another for the purpose of a pulling-out motion of guidance rod 94 out of extension component 98.

An outer helical compression spring 102 radially externally surrounding the extension component, which spring is braced at one end against a boss 104 that is arranged in stationary fashion at that longitudinal end of extension component 98 which is remote from the insertion connector component and is braced at the other end against bearing segment 96 of second segment 90*b* of support component 90, loads extension component 98 relative to second segment 90*b* of support component 90 for the purpose of a motion of the end-mounted boss 104 away from bearing segment 96. A projection that is provided for motion together with guidance rod 94, and is implemented e.g. by a pin 106 that passes diametrically through guidance rod 94 and engages into an elongated hole 108 on extension component 98, limits the relative movability of guidance rod 94 and extension component 98 relative to one another. Elongated hole 108 extends in the direction of trajectory ST, i.e. in the direction of the relative movability of guidance rod 94 and extension component 98.

Inner and outer helical compression springs 100 and 102 thus define a neutral position of first segment 90*a* relative to second segment 90*b* of support component 90, from which position first segment 90*a* is deflectable relative to second segment 90*b* along trajectory ST in both opposite directions. On the one hand, insertion connector component 32 is movable toward the towing vehicle under the compression of outer spring 102, and on the other hand insertion connector component 32 is movable along trajectory ST away from the towing vehicle under the compression of inner spring 100. The above-described preload and return assembly, encompassing guidance rod 94, extension component 98, springs 100 and 102, and boss 104, is of identical construction for both guidance rods.

As a result of this relative movability—rotationally around the two insertion connector rotation axes SD1 and SD2 and translationally along trajectory ST—of towed vehicle-side insertion connector component 32 relative to the drawbar, the insertion connection of insertion connector components 30 and 32 to one another can be effected at any desired point regardless of the location of turning axis AA that coincides with longitudinal center axis KL of the hitch bolt. Towing vehicle-side insertion connector component 30 can thus be arranged, in the manner described above, on coupling jaw 18 offset orthogonally to turning axis AA.

The establishment of a positive engagement between alignment components 38 and 40, and the fastening thereof to one another once the positive engagement has been established, will be described below with reference to FIGS. 7 to 9.

FIG. 7 describes a situation that exists while the towing vehicle is approaching the towed vehicle in approach direction AN in order to establish a hitched connection with an automatically established insertion connection. Alignment components 38 and 40 respectively of the towing vehicle and towed vehicle are remote from one another in the longitudinal direction of the two vehicles. As a result of the relative motion of the towing vehicle relative to the towed vehicle, towing vehicle-side alignment component 38 approaches towed vehicle-side alignment component 40 in direction AN.

Provided on towed vehicle-side alignment component 40, at the longitudinal end that faces toward the towing vehicle upon establishment of a hitched connection, is a locking shackle 110 that spans, in transverse towed-vehicle direction NQ, a recess 112 in towed vehicle-side alignment configuration 44.

Thanks to towing vehicle-side alignment configuration 42, locking hook 80 is in the introduction position in which locking shackle 110 is introducible into a hook jaw 80a of locking hook 80. Hook jaw 80a is limited on its two sides by a hook limb 80b and by a tripping limb 80c, which are connected via a hook base 80d through which, in the example depicted, pivot axis SP of locking hook 80 passes.

Hook limb 80b protrudes out from hook base 80d less than does tripping limb 80c, which abuts against actuation limb 74b of latching bar 74 that is preloaded into its latched position by spring 76.

In FIG. 8, the approach of the towing vehicle, and thus of towing vehicle-side hitch component 14, toward towed vehicle-side hitch component 24 has progressed sufficiently that locking shackle 110 abuts against tripping limb 80c.

An abutment segment 86b of guidance component 86 also abuts against a counter-abutment segment 38a of towing vehicle-side alignment component 38. In the example depicted, the counter-abutment segment is constituted by a lower introduction bevel of towing vehicle-side alignment configuration 42. Abutting engagement of abutment segment 86b against counter-abutment segment 36a has already been established at an earlier point in time, when towing vehicle-side and towed vehicle-side hitch components 14 and 24 had approached one another more closely than shown in FIG. 7, but less closely than shown in FIG. 8. As a result of the continued approach motion of towing vehicle-side and towed vehicle-side hitching components 14 and 24 toward one another after establishment of the abutting engagement of guidance component 86 with towing vehicle-side alignment component 38, guidance component 86 has been moved along longitudinal towed-vehicle axis NL relative to receiving component 82 and thus also relative to towed vehicle-side insertion connector component 32, so that as a further result of the positive engagement of cam 32b with gate 86a in the lateral limbs of guidance component 86, a pivoting motion of insertion connector component 32 from the stowage position of FIG. 7 toward the connection awaiting position of FIG. 9 has begun.

As a result of the abutment, depicted in FIG. 8, of locking shackle 110 against tripping limb 80c of locking hook 80, as towing vehicle-side and towed vehicle-side hitching components 14 and 24 continue to approach one another, locking hook 80 is shifted by locking shackle 110 into its locked position shown in FIG. 9. In this context, the tip of tripping limb 80c sweeps along actuation limb 74b of latching bar 74 and shifts latching bar 74 into the release position, in which latching limb 74a comes out of engagement with latching recess 66b of drive component 66 so that drive component 66, driven by helical compression springs 72, is displaced from its starting position into the end position. Towing vehicle-side insertion connector component 30 is thereby shifted along the connecting trajectory from the connection readiness position shown in FIGS. 7 and 8 into the connection activation position shown in FIG. 9.

When locking hook 80 is in the locked position shown in FIG. 9, tripping limb 80c has completely swept over actuation limb 74b of latching bar 74 so that as a result of the preloading of latching bar 74 into its latched position, a longitudinal end of actuation limb 74b comes into abutment against a flank, facing toward the towed vehicle, of tripping limb 80c and thus locks locking hook 80 in its locked position against displacement out of said position toward the introduction position.

In addition, in the position shown in FIG. 9, recess 112 is penetrated by hook limb 80b so that hook limb 80b engages behind locking shackle 110 that is received in hook jaw 80 when locking hook 80 is in the locked position. Alignment components 38 and 40 are thus fastened to one another, and secured against release of their positive engagement.

In the position shown in FIG. 9, guidance component 86 has reached its final position so that towed vehicle-side insertion connector component 32 is in the connection awaiting position in which an insertion connection to towing vehicle-side insertion connector component 30 can easily be established by displacement thereof along connecting trajectory VT into the connection activation position.

According to a preferred refinement of the present invention, insertion connector components 30 and 32 are not separately positionally secured to one another, in particular not snap-locked to each other or the like, when the insertion connection is established. Insertion connector components 30 and 32 are merely caused to approach one another, and the respective insertion connector configurations are brought into contact engagement, if applicable slid into one another.

According to a preferred refinement of the present invention, the relative position of towing vehicle-side and towed vehicle-side hitching components 14 and 24, in which the positive engagement of alignment components 38 and 40 is secured against disconnection of the positive engagement, is undone as follows:

As is evident in particular from FIG. 4, Kinetrol actuator 22 provided for moving the hitch bolt out of towing eye 20 is also connected via a Bowden cable 120 to drive component 66. When Kinetrol actuator 22 lifts the hitch bolt for release out of a position in which it passes through towing eye 20 of the towed vehicle component, drive component 66 is also shifted back into its starting position under the load of helical compression springs 72. In the context of this return motion, in which towing vehicle-side insertion connector component 30 is also shifted back into the connection readiness position because of the constrained guidance by cam 66a and gate 30, an insertion bevel 66c of drive component 66 pushes on latching limb 74a of latching bar 74 and pushes it downward, so that actuation limb 74b of that latching bar 74 lifts up. In this lifting motion, tripping limb 80c of locking hook 80 is released so that it can move or be moved back, driven by the preload force of spring 78, toward the introduction position. Towed vehicle-side alignment component 40 can thus be moved out of positive engagement with towing vehicle-side alignment component 38, specifically in approach motion direction AN. In the context of this motion, locking shackle 110 that is then pushing against hook limb 80b assists a shift of locking hook 80 back into the introduction position. Hitch components 14 and 24 can then readily be separated from one another, since no further locking engagement or latching engagement of any kind exists between their components.

Figure 10:
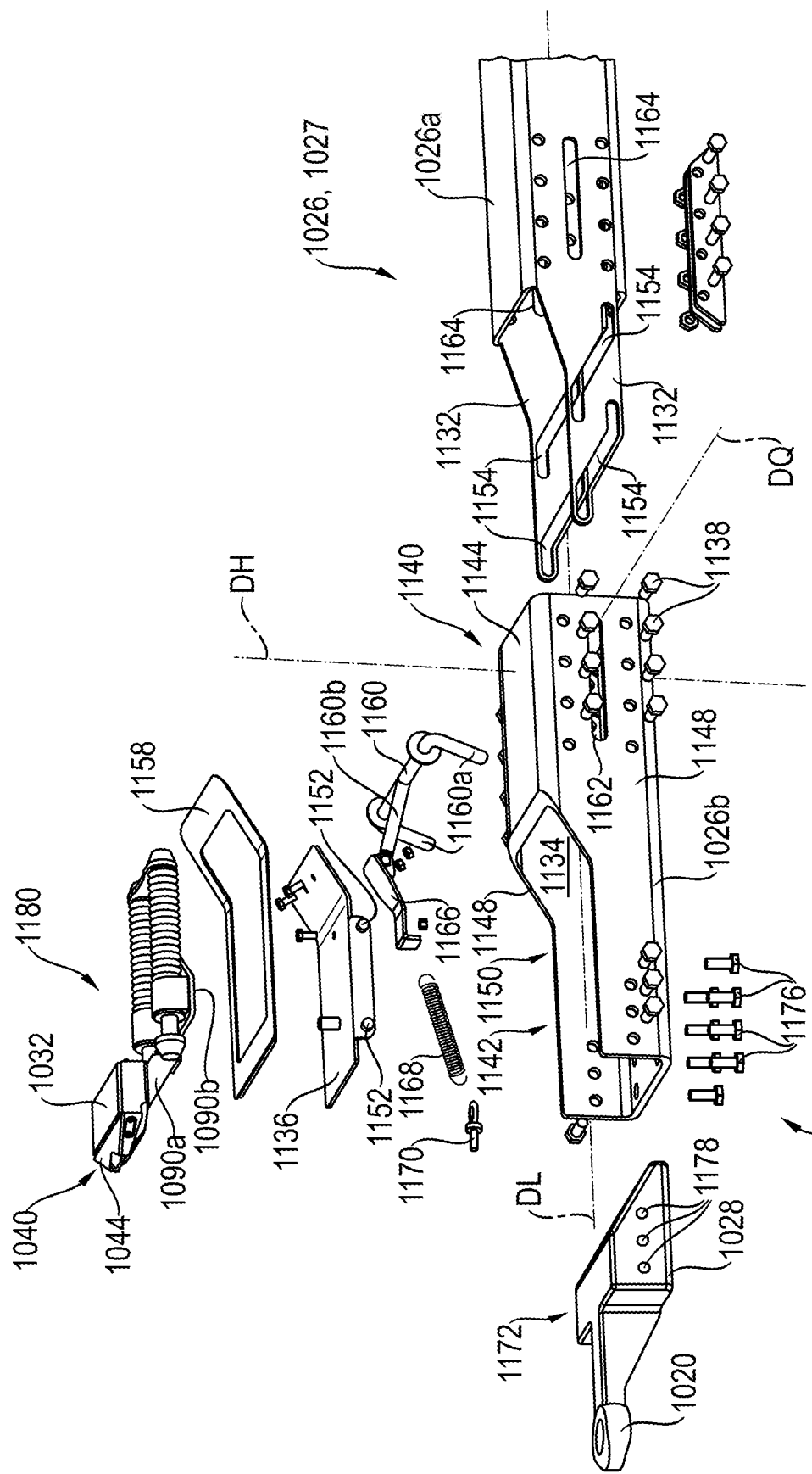
FIG. 10 is a perspective exploded view of a second embodiment of the towed vehicle-side hitch component.
Figure 11:
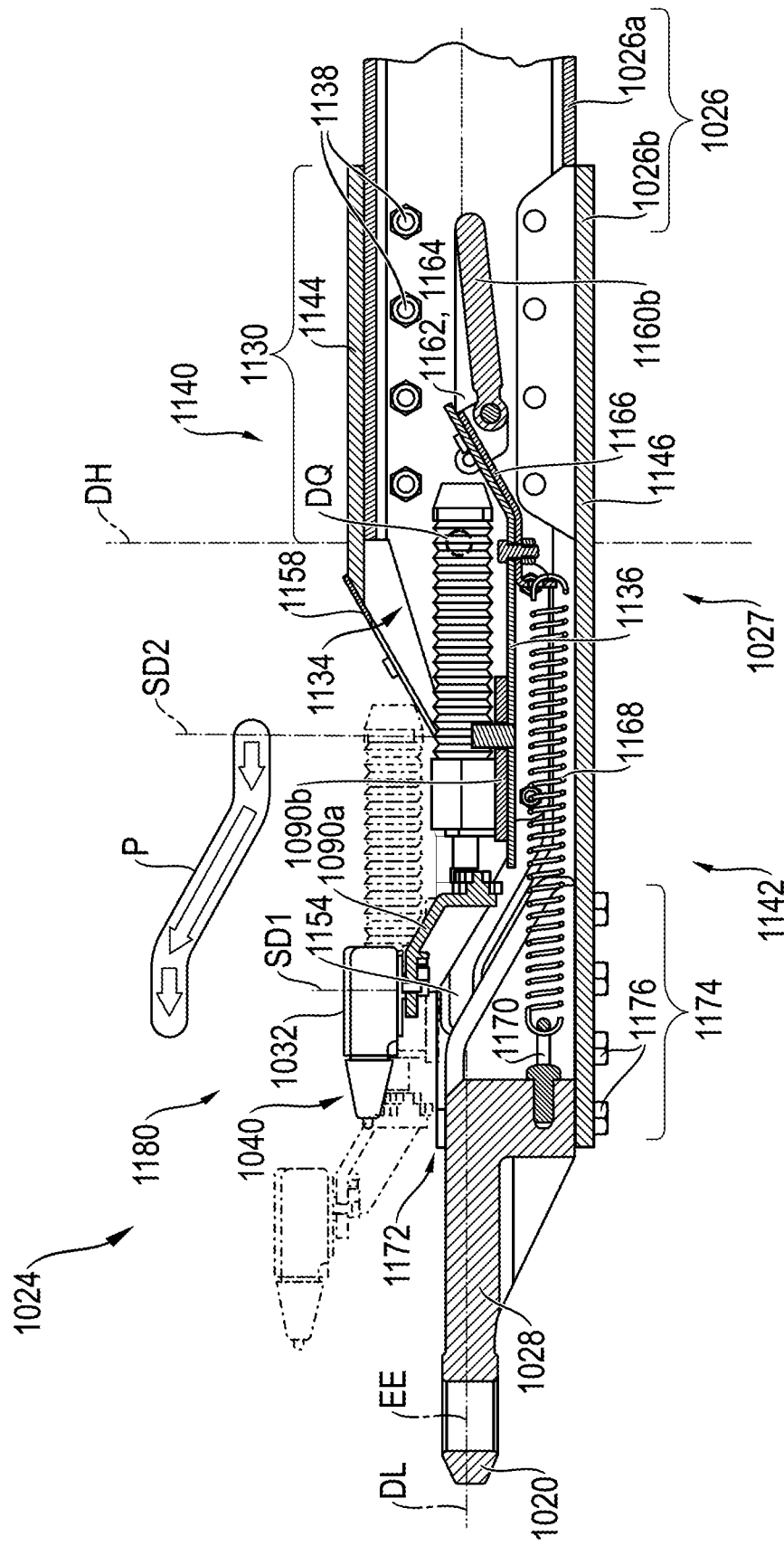
FIG. 11 is a longitudinal section view through the second embodiment of the towed vehicle-side hitch component in the fully installed state.

FIGS. 10 and 11 depict a particularly preferred drawbar 1026 of the towed vehicle. Components and component segments that are identical and functionally identical to those on drawbar 26 of FIGS. 1 to 9 are labeled in FIGS. 10 to 11 with the same reference characters but incremented by 1000. Drawbar 1026 is described below only insofar as it differs from the drawbar 26 described above, to the description of which reference is otherwise expressly made.

Drawbar 1026 comprises a drawbar body 1027 having a first drawbar-body component 1026a that extends along longitudinal drawbar-body axis DL, away from a longitudinal vehicle end of drawbar 1026 located closer to a towed vehicle body, to a longitudinal hitch end of drawbar 1026 which is marked by towing eye 1020 and is axially oppositely located with reference to longitudinal drawbar-body axis DL. In an axial direction away from the longitudinal vehicle end, first drawbar-body component 1026a is adjoined by second drawbar-body component 1026b of drawbar body 1027, which is retained on first drawbar-body component 1026a in a fastening segment 1130 (see FIG. 11). In this fastening segment 1130, second drawbar-body component 1026b surrounds first drawbar-body component 1026a radially externally, preferably with very small gap dimensions between the mutually oppositely located wall segments of drawbar-body components 1026a and 1026b. Particularly preferably, at least portions of the mutually oppositely located wall segments of first and second drawbar-body components 1026a and 1026b abut against another in the fully installed state.

First drawbar-body component 1026a has a closed rectangular cross section when viewed in a section plane orthogonal to longitudinal drawbar-body axis DL. The corners of the rectangular cross section are embodied in rounded fashion.

Side walls of first drawbar-body component 1026a, extending along longitudinal drawbar-body axis DL and along vertical drawbar-body axis DH, are axially prolonged as side cheekpieces 1132, so that they can be used as guidance segments for motion guidance of a cover 1136 that is lowerable into an interior space 1134 of drawbar 1026.

In fastening segment 1130, first and second drawbar-body components 1026a and 1026b are connected to one another exclusively by way of retaining means (in this case screw/nut combinations 1138) having an extent orthogonal to longitudinal drawbar-body axis DL. Retaining means 1138 thus pass through both first and second drawbar-body component 1026a and 1026b in a direction orthogonal to longitudinal drawbar-body axis DL.

Second drawbar-body component 1026b comprises a first component segment 1140 that, when viewed in a section plane orthogonal to longitudinal drawbar-body axis DL, likewise has a closed cross section as does first drawbar-body component 1026a.

Axially adjacent to component segment 1140 having a closed cross section is a component segment 1142 of second drawbar-body component 1026b in which second drawbar-body component 1026b has an open cross section. Component segment 1140 having a closed cross section is therefore the one located closer to first drawbar-body component 1026a, which also contributes to fastening segment 1130, while component segment 1142 having an open cross section is located closer to the longitudinal hitch end of drawbar 1026.

In component segment 1140 having a closed cross section, second drawbar-body component 1140 likewise has a closed rectangular cross section encompassing a drawbar-body top 1144, a drawbar-body bottom 1146 arranged at a distance from said top along vertical drawbar axis DH, and two drawbar-body side limbs 1148 arranged at a distance from one another along transverse drawbar axis DQ. Drawbar-body side limbs 1148 connect drawbar-body top 1144 to drawbar-body bottom 1146.

In drawbar-body segment 1142 having an open cross section, second drawbar-body component 1026b comprises only drawbar-body bottom 1148 and two parallel drawbar-body side limbs 1148 protruding therefrom. A drawbar-body top 1144 is therefore not present in drawbar-body segment 1142. In addition, drawbar-body side limbs 1148 are embodied to be shorter, along vertical drawbar-body axis DH, in a region of drawbar-body segment 1142 having an open cross section which proceeds from that longitudinal end of second drawbar-body component 1026b which is located closest to towing eye 1020, than in drawbar-body segment 1140 having a closed cross section. An externally accessible opening 1150, through which internal region 1134 of drawbar 1026 is accessible, is thus constituted in drawbar-body segment 1142 having an open cross section.

Objects, for example vehicle-carried tools or the like, can e.g. be placed through this opening 1150 into internal space 1134 of drawbar 1026 and retained in suitable fashion. Drawbar 1026 is thus usable, for example, as a storage space.

In the present exemplifying embodiment, opening 1150 is closable by way of cover 1136 already previously mentioned, and selectably openable for engagement. Cover 1136 echoes, in terms of its shape, opening 1150 that it is intended close off. Cover 1136 comprises, on its sides, projections 1152 that are embodied in gate guides 1154 in side cheekpieces 1132, which are constituted as axial prolongations of the drawbar-body side limbs of first drawbar-body component 1026a. Cover 1136 is thus lowerable and pullable, along vertical drawbar-body axis DH and along longitudinal drawbar-body axis DL, into internal region 1134 of drawbar 1026. In FIG. 11, cover 1136 is shown with solid lines in its inactive position retracted into drawbar internal space 1134, and is shown with a dot-dash line in its active position in which it closes off opening 1150. Cover 1136 is displaceable from the inactive position into the active position along arrow sequence P in FIG. 11.

In order to seal opening 1150 when cover 1136 is in the active position, a seal 1158, against which that side of cover 1136 which faces toward drawbar internal region 1134 abuts in the active position, is provided on opening 1150. Seal 1158 can, for example, be cut out from a rubber mat, or generally from an elastomer mat.

In order to shift cover 1136 between the active position and inactive position, it can be coupled to a manual actuation member 1160 that, in the example depicted, passes through drawbar 1026 along transverse drawbar-body axis DQ. Drawbar-body side limbs 1148 comprise for this purpose, in component segment 1140 having a closed cross section, elongated holes 1162 that extend in an axial direction with reference to longitudinal drawbar-body axis DL and are overlain, in the fully installed state, by elongated holes 1164 of approximately the same format in the side limbs of first drawbar-body component 1026a.

The manual actuation member comprises, on either side of drawbar 1026, a respective manual grip segment 1160*a* that can easily be gripped by an operator from outside drawbar 1026.

Manual actuation member 1160 is furthermore connected articulatedly via a connecting rod 1160*b* to a connecting element 1166 that at one end, as is evident from FIG. 11, is connected to cover 1136, and at the other end serves as a spring buttress for a helical compression preload spring 1168 that preloads cover 1136 into the active position. Retaining means (not depicted in FIGS. 10 and 11) can be provided in order to temporarily retain cover 1136 in the inactive position against the preload force of spring 1168.

As is further evident from FIG. 11, the opposing spring buttress of helical compression spring 1168 is retained on towing-eye component 1028, for example, by way of an eye bolt 1170 threaded into it.

Towing-eye component 1028 is likewise noteworthy in terms of its conformation and its retention on drawbar body 1027, more precisely on second drawbar-body component 1026*b*:

Towing-eye component 1028 on the one hand comprises towing eye 1020 at one longitudinal end, and at its other longitudinal end comprises a retaining configuration 1172.

In the fully installed state, towing-eye component 1028, in particular its retaining configuration 1172, is radially externally surrounded with respect to longitudinal drawbar-body axis DL by only three sides of drawbar 1026, more precisely by second drawbar-body component 1026*b*, even more precisely by drawbar-body segment 1142 having an open cross section. This means that retaining configuration 1172 of towing-eye component 1028 rests on drawbar-body bottom 1148 of drawbar 1026, more precisely of second drawbar-body component 1026*b*, and is enclosed on both sides, along transverse drawbar-body axis DQ, by drawbar-body side limbs 1148 that are embodied, in the relevant overlap segment with retaining configuration 1172 of towing-eye component 1028, to be shorter in the vertical drawbar-body direction compared with segment 1140 having a closed cross section.

In particular, there is no positive axial engagement by any drawbar-body segment around, or other engagement behind, towing-eye component 1028 axially in a pulling-out direction out of drawbar body 1027, i.e. toward a towing vehicle located in front of drawbar 1026.

Like the two drawbar-body components 1026*b* and 1026*a* previously, towing-eye component 1028 is retained, in drawbar-body retaining segment 1174 of second drawbar-body component 1026*b* which overlaps it, on second drawbar-body component 1026*b* exclusively with retaining means that pass through second drawbar-body component 1026*b* in a direction orthogonal to longitudinal drawbar-body axis DL and either likewise pass through retaining configuration 1172 of towing-eye component 1028 orthogonally to longitudinal drawbar-body axis DL or project in that direction into the retaining configuration. In the example depicted, retaining means 1176 are threaded in the form of screws into blind holes 1178 in retaining configuration 1172 of towing-eye component 1028. Blind holes 1178 are provided with an internal thread for that purpose. In the example depicted, retaining configuration 1172 is embodied in a U-shape, the two side limbs of retaining configuration 1172 standing out along longitudinal drawbar-body axis DL from the base, connecting the side limbs, of retaining configuration 1172. Towing eye 102 is preferably connected intermaterially to the base as a single piece.

The passthrough holes for screws, and passthrough holes 1162 and 1164 in the respective drawbar-body components 1026*a* and 1026*b*, are minor perforations of those components and are not intended to change anything regarding the assessment of the segment carrying them as a segment having a closed cross section.

Cover 1136 not only can close off opening 1150 but can furthermore carry a functional assembly, for example assembly 1180, described in detail above, for automated establishment of an energy- and/or information-transferring connection to a towing vehicle hitched onto drawbar 1026.

Functional assembly 1180 is depicted in FIG. 11 in its non-utilization position, i.e. when cover 1136 is in the inactive position, with a solid line. Advantageously, functional assembly 1180, which, when cover 1136 is in the active position, is brought close to the towing vehicle-side hitch component to which towing eye 1020 is hitchable, is received within the envelope of second drawbar-body component 1026*b* when cover 1136 is in the inactive position, said envelope being obtained when its segment 1140 having a closed cross section is considered to be prolonged over the entire axial length of second drawbar-body component 1026*b*. The resulting small protrusion dimension of functional assembly 1180 in its non-utilization position considerably reduces the risk of damage to it when not in use. When functional assembly 1180 is in its non-utilization position, parts thereof are in fact received in interior 1134 of drawbar 1026, and it is surrounded on all sides by a drawbar wall of segment 1140 having a closed cross section.

The invention claimed is:

1. A hitching apparatus for temporary connection of a towing vehicle to a towed vehicle, the hitching apparatus comprising:
    a towing vehicle-side hitch component;
    a towed vehicle-side hitch component, the towing vehicle-side hitch component and towed vehicle-side hitch component being releasably hitchable to one another to constitute a temporary hitched connection, the temporary hitched connection being configured to transfer a towing force on which towing of the towed vehicle is based;
    a towing vehicle-side insertion connector component having at least one insertion connector configuration as an interface of a towing vehicle-side supply lead for transferring at least one of energy and information;
    a towed vehicle-side insertion connector component having at least one insertion connector configuration as an interface of a towed vehicle-side supply lead for transferring at least one of energy and information, the towing vehicle-side insertion connector component and the towed vehicle-side insertion connector component being releasably connectable to one another to constitute at least one of a temporary energy-transferring insertion connection and a temporary information-transferring insertion connection;
    a towing vehicle-side alignment component separate from the towing vehicle-side hitch component and arranged thereon, which carries the towing vehicle-side insertion connector component, and including an alignment configuration;
    a towed vehicle-side alignment component separate from the towed vehicle-side hitch component and arranged thereon, which carries the towed vehicle-side insertion connector component, and including an alignment configuration,
    one of the towing vehicle-side alignment component and the towed vehicle-side alignment component being movable relative to the respective hitch component carrying the one alignment component, so that the alignment configuration of the one alignment component is conveyable, for mutual insertion connection-preparing alignment of the towing vehicle-side insertion connector component and the towed vehicle-side insertion connector component, into positive engagement with the alignment configuration of the other one of the towing vehicle-side alignment component and the towed vehicle-side alignment component, wherein at least one insertion connector component from among the towing vehicle-side connector component and the towed vehicle-side insertion connector component is displaceable relative to the alignment component carrying the at least one insertion connector component, wherein the at least one insertion connector component from among one of the towing vehicle-side insertion connector component and the towed vehicle-side insertion connector component is displaceable, relative to the alignment component carrying the at least one insertion connector component, between a retracted connection readiness position and an advanced connection activation position, wherein the at least one insertion connector component is guided movably on a carrying component, a force device being arranged on one component from among the at least one insertion connector component and carrying component and being configured to drive the at least one insertion connector component in at least one direction so as to move between the connection readiness position and the connection activation position, wherein the one component from among the at least one insertion connector component and carrying component is configured to drive the at least one insertion connector component only from the connection readiness position into the connection activation position.

2. The hitching apparatus according to claim 1, wherein each alignment component is movable relative to the hitch component carrying the respective alignment component.

3. The hitching apparatus according to claim 1, wherein each insertion connector component is displaceable relative to the alignment component carrying the respective insertion connector component.

4. The hitching apparatus according to claim 1, wherein the at least one insertion connector component is displaceable between the connection readiness position and the connection activation position along a connecting trajectory that in consideration of a reference state with the towing vehicle and the towed vehicle that are standing on a common flat horizontal substrate and follow one another in a longitudinal vehicle direction with coplanar longitudinal vehicle center planes orthogonal to the substrate is different from a hitching trajectory along which the towing vehicle-side and towed vehicle-side hitch components can be caused to approach one another in order to establish the hitched connection or to move away from one another to undo the hitched connection.

5. The hitching apparatus according to claim 4, wherein the connecting trajectory and the hitching trajectory enclose an angle with one another and lie in one common plane.

6. The hitching apparatus according to claim 5, wherein the one common plane is coplanar with the longitudinal center plane of the vehicle carrying the insertion connector component.

7. The hitching apparatus according to claim 1, wherein the at least one insertion connector component is the towing vehicle-side insertion connector component and is arranged above the towing vehicle-side hitch component.

8. The hitching apparatus according to claim 1, wherein the force device is a compression spring.

9. The hitching apparatus according to claim 8, wherein the compression spring interacts with a drive component, spring energy stored in the compression spring being greater when the drive component is in an initial position than when the drive component is in an end position.

10. The hitching apparatus according to claim 8, wherein the compression spring interacts with a drive component, spring energy stored in the compression spring being greater when the drive component is in an initial position than when the drive component is in an end position.

11. The hitching apparatus according to claim 1, wherein a drive component is indirectly or directly coupled to the towing vehicle-side hitch component carrying the drive component, in such a way that a releasing motion of a hitch member of the towing vehicle-side hitch component to undo the hitched connection to the respective other hitch component brings about a motion of the drive component into the initial position.

12. A hitching apparatus for temporary connection of a towing vehicle to a towed vehicle, the hitching apparatus comprising:
a towing vehicle-side hitch component;
a towed vehicle-side hitch component, the towing vehicle-side hitch component and towed vehicle-side hitch component being releasably hitchable to one another to constitute a temporary hitched connection, the temporary hitched connection being configured to transfer a towing force on which towing of the towed vehicle is based;
a towing vehicle-side insertion connector component having at least one insertion connector configuration as an interface of a towing vehicle-side supply lead for transferring at least one of energy and information;
a towed vehicle-side insertion connector component having at least one insertion connector configuration as an interface of a towed vehicle-side supply lead for transferring at least one of energy and information, the towing vehicle-side insertion connector component and the towed vehicle-side insertion connector component being releasably connectable to one another to constitute at least one of a temporary energy-transferring insertion connection and a temporary information-transferring insertion connection;
a towing vehicle-side alignment component separate from the towing vehicle-side hitch component and arranged thereon, which carries the towing vehicle-side insertion connector component, and including an alignment configuration;
a towed vehicle-side alignment component separate from the towed vehicle-side hitch component and arranged thereon, which carries the towed vehicle-side insertion connector component, and including an alignment configuration,
one of the towing vehicle-side alignment component and the towed vehicle-side alignment component being movable relative to the respective hitch component carrying the one alignment component, so that the alignment configuration of the one alignment component is conveyable, for mutual insertion connection-preparing alignment of the towing vehicle-side insertion connector component and the towed vehicle-side insertion connector component, into positive engagement with the alignment configuration of the other one of the towing vehicle-side alignment component and the towed vehicle-side alignment component, wherein at least one insertion connector component from among the towing vehicle-side connector component and the towed vehicle-side insertion connector component is displaceable relative to the alignment component carrying the at least one insertion connector component, wherein the at least one insertion connector component from among one of the towing vehicle-side insertion connector component and the towed vehicle-side insertion connector component is displaceable, relative to the alignment component carrying the at least one insertion connector component, between a retracted connection readiness position and an advanced connection activation position, wherein the at least one insertion connector component is guided movably on a carrying component, a force device being arranged on one component from among the at least one insertion connector component and carrying component and being configured to drive the at least one insertion connector component in at least one direction so as to move between the connection readiness position and the connection activation position, wherein the force device encompasses a drive component guided movably on the carrying component, which is coupled for bidirectional motion transfer to the at least one insertion connector component, the drive component being movable between an initial position and an end position along a drive trajectory that is different from a connecting trajectory of the at least one insertion connector component.

13. The hitching apparatus according to claim 12, wherein the drive trajectory is orthogonal to the connecting trajectory, and the at least one insertion connector component being in the connection readiness position when the drive component is in the initial position, and the at least one insertion connector component being in the connection activation position when the drive component is in the end position.

14. The hitching apparatus according to claim 13, wherein the drive component is latchable at least in the initial position against motion toward the end position.

15. The hitching apparatus according to claim 14, wherein a latching bar, which is shiftable between a latched position in which the latching bar latches the drive component in the initial position against motion toward the end position and a release position in which the latching bar releases the drive component to move toward the end position, is provided.

16. The hitching apparatus according to claim 15, wherein the latching bar is preloaded into the latched position.

17. The hitching apparatus according to claim 12, wherein the force device is a compression spring.

18. The hitching apparatus according to claim 12, wherein a drive component is indirectly or directly coupled to the towing vehicle-side hitch component carrying the drive component, in such a way that a releasing motion of a hitch member of the towing vehicle-side hitch component to undo the hitched connection to the respective other hitch component brings about a motion of the drive component into the initial position.

* * * * *